US011935489B2

(12) United States Patent
Wai et al.

(10) Patent No.: US 11,935,489 B2
(45) Date of Patent: Mar. 19, 2024

(54) DISPLAY DRIVER AND CONTROL METHOD, DISPLAY CONTROL CIRCUIT SYSTEM, AND ELECTRONIC DEVICE

(71) Applicant: Huawei Technologies Co., Ltd., Shenzhen (CN)

(72) Inventors: Dustin Yuk Lun Wai, Shenzhen (CN); Kun Wang, Shanghai (CN); Anli Wang, Shenzhen (CN); Liang Wang, Shanghai (CN); Chiaching Chu, Shenzhen (CN); Jialiang Sun, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 68 days.

(21) Appl. No.: 17/758,935

(22) PCT Filed: Dec. 18, 2020

(86) PCT No.: PCT/CN2020/137698
§ 371 (c)(1),
(2) Date: Jul. 15, 2022

(87) PCT Pub. No.: WO2021/143458
PCT Pub. Date: Jul. 22, 2021

(65) Prior Publication Data

US 2023/0040656 A1 Feb. 9, 2023

(30) Foreign Application Priority Data

Jan. 17, 2020 (CN) ......................... 202010054176.0

(51) Int. Cl.
*G09G 3/3291* (2016.01)

(52) U.S. Cl.
CPC ....... *G09G 3/3291* (2013.01); *G09G 2310/08* (2013.01); *G09G 2330/021* (2013.01);
(Continued)

(58) Field of Classification Search
CPC .. G09G 3/3291; G09G 3/2092; G09G 3/3233; G09G 5/393; G09G 2360/08;
(Continued)

(56) References Cited

U.S. PATENT DOCUMENTS

| | | | |
|---|---|---|---|
| 2007/0057952 A1 | 3/2007 | Swedberg et al. | |
| 2008/0174540 A1 | 7/2008 | Lee | |

(Continued)

FOREIGN PATENT DOCUMENTS

| | | | |
|---|---|---|---|
| CN | 1816844 A | 8/2006 | |
| CN | 101231835 A | 7/2008 | |

(Continued)

*Primary Examiner* — Shaheda A Abdin
(74) *Attorney, Agent, or Firm* — Slater Matsil, LLP

(57) ABSTRACT

This application provides an electronic device, to reduce a probability that a screen stalling phenomenon. A timing control unit sends one first pulse of a tearing effect signal every a first preset time T1. The timing control unit sends S second pulses of the tearing effect signal when a transceiver unit does not receive an $N^{th}$ frame of display data within a preset time. The processing unit receives the $N^{th}$ frame of display data in the $(N+1)^{th}$ frame, and controls, based on the $N^{th}$ frame of display data, the display to display an $N^{th}$ frame of image.

20 Claims, 12 Drawing Sheets

(52) U.S. Cl.
CPC . *G09G 2340/0435* (2013.01); *G09G 2360/18* (2013.01); *G09G 2370/08* (2013.01)

(58) Field of Classification Search
CPC ........... G09G 2360/10; G09G 2360/18; G09G 2360/128; G09G 2370/08; G09G 2320/103; G09G 2370/10; G09G 2330/021; G09G 2340/0435; G09G 2360/121; G09G 2310/08
See application file for complete search history.

(56) References Cited

U.S. PATENT DOCUMENTS

| | | | | |
|---|---|---|---|---|
| 2009/0135106 | A1 | 5/2009 | Lee et al. | |
| 2013/0057763 | A1* | 3/2013 | Cha | G09G 5/12 348/554 |
| 2013/0083047 | A1 | 4/2013 | Shamarao et al. | |
| 2013/0155036 | A1* | 6/2013 | Kim | G09G 3/2092 345/204 |
| 2013/0224791 | A1* | 8/2013 | Taft | G01N 29/07 435/40.52 |
| 2013/0293779 | A1* | 11/2013 | Li | G09G 5/12 348/521 |
| 2014/0118377 | A1* | 5/2014 | Bae | G09G 5/005 345/545 |
| 2015/0015591 | A1 | 1/2015 | Oh et al. | |
| 2015/0033047 | A1* | 1/2015 | Byun | G09G 5/36 713/320 |
| 2015/0042668 | A1 | 2/2015 | Jeon | |
| 2016/0196801 | A1 | 7/2016 | Glen | |
| 2016/0343355 | A1 | 11/2016 | Kim et al. | |
| 2017/0193971 | A1 | 7/2017 | Bi et al. | |
| 2019/0035337 | A1 | 1/2019 | Kato | |

FOREIGN PATENT DOCUMENTS

| | | | |
|---|---|---|---|
| CN | 101877213 | A | 11/2010 |
| CN | 102982759 | A | 3/2013 |
| CN | 103377638 | A | 10/2013 |
| CN | 103714559 | A | 4/2014 |
| CN | 104347023 | A | 2/2015 |
| CN | 105390083 | A | 3/2016 |
| CN | 105430296 | A | 3/2016 |
| CN | 106658170 | A | 5/2017 |
| CN | 109474768 | A | 3/2019 |
| CN | 110609645 | A | 12/2019 |
| DE | 102018130037 | A1 | 5/2019 |

* cited by examiner

DISPLAY DRIVER AND CONTROL METHOD, DISPLAY CONTROL CIRCUIT SYSTEM, AND ELECTRONIC DEVICE

CROSS-REFERENCE TO RELATED APPLICATIONS

This application is a national stage of International Application No. PCT/CN2020/137698, filed on Dec. 18, 2020, which claims priority to Chinese Patent Application No. 202010054176.0, filed on Jan. 17, 2020. Both of the aforementioned applications are hereby incorporated by reference in their entireties.

TECHNICAL FIELD

This application relates to the field of electronics and communications technologies, and in particular, to a display driver and a control method, a display control circuit system, and an electronic device.

BACKGROUND

In an electronic device with a display function, there are two manners of transmitting image data to a display in the electronic device: a video mode (video mode) and a command mode (command mode). In the video mode, display data may be transmitted to the display in real time based on a refresh rate time sequence of the display. In the command mode, display data is first stored in a buffer (buffer), and then the display data is extracted from the buffer and transmitted to the display for display. In this way, the display data in the buffer needs to be updated only when a display image needs to be changed.

However, if the command mode is used, when the electronic device displays a relatively complex dynamic image, display data of the dynamic image is relatively complex and a processing time is relatively long. Therefore, because the display data is not saved to the buffer in time, the display cannot extract updated display data, and the image displayed on the display cannot be updated. In this way, an image stalling phenomenon occurs when the electronic device displays the dynamic image.

SUMMARY

This application provides a display driver and a control method, a display control circuit system, and an electronic device, to reduce, in a command mode, a probability that a screen stalling phenomenon occurs during display of a dynamic image.

To achieve the foregoing objective, the following technical solutions are used in this application.

According to a first aspect of the embodiments of this application, a display driver is provided. The display driver is configured to drive a display to perform display. The display driver includes a timing control unit, a transceiver unit, and a processing unit. The timing control unit is configured to send one first pulse of a tearing effect signal every a first preset time T1, where the first preset time T1=1/f1, and f1 is a first refresh rate of the display. The first pulse of the tearing effect signal is used to indicate a host to output a generated $N^{th}$ frame of display data in an $(N+1)^{th}$ frame based on the first pulse of the tearing effect signal, where N is a positive integer. The transceiver unit is configured to receive and send the display data sent by the host. The timing control unit is further configured to send S second pulses of the tearing effect signal when the transceiver unit does not receive the $N^{th}$ frame of display data within a preset time, where the S second pulses of the tearing effect signal are used to prolong duration of the $N^{th}$ frame by a second preset time T2, and indicate the host to output the generated $N^{th}$ frame of display data in the $(N+1)^{th}$ frame based on an $S^{th}$ second pulse of the tearing effect signal, S is a positive integer, $(T1+T2)\leq(1/f2)$, f2 is a second refresh rate of the display, and the first refresh rate is greater than the second refresh rate. The processing unit is coupled to the transceiver unit, and is configured to: receive the $N^{th}$ frame of display data in the $(N+1)^{th}$ frame, and control, based on the $N^{th}$ frame of display data, the display to display an $N^{th}$ frame of image. In conclusion, when a time used by the host to generate one frame such as the $N^{th}$ frame of display data exceeds a time interval between two adjacent first pulses of the tearing effect signal, for example, the first preset time T1, in other words, exceeds duration (for example, T1=1/f1=1/120 Hz=8.33 ms) of each frame of image corresponding to a resolution (for example, a first resolution f1=120 Hz) used during normal display of the display, one second pulse may be regenerated by using the tearing effect signal, to prolong duration of the frame T1+T2, so that the host can generate the display data in the $N^{th}$ frame, and further, the display can be controlled, in the $(N+1)^{th}$ frame, to display the $N^{th}$ frame of image. In this way, in the $(N+1)^{th}$ frame, the display driver does not control the display to repeatedly display an $(N-1)^{th}$ frame of image because the display driver cannot receive the $N^{th}$ frame of image. Therefore, an image stalling phenomenon can be reduced, and power consumption of the display can be reduced.

Optionally, the timing control unit is specifically configured to send the second pulse of the tearing effect signal when it is determined, for M consecutive times every a third preset time T3 each time, that $(T1+M\times T3)=(1/f2)$. When the $S^{th}$ second pulse of the tearing effect signal is sent, the $N^{th}$ frame ends, and the duration of the $N^{th}$ frame is $(T1+T2)=(1/f2)$, where $M\geq S$, M is a positive integer, and $M\times T3=T2$. In this way, when the display driver still does not receive the $N^{th}$ frame of display data within a preset time after one second pulse of the tearing effect signal is regenerated, the display driver may continue to regenerate the second pulse of the tearing effect signal until the host can generate the $N^{th}$ frame of display data after the duration of the $N^{th}$ frame is prolonged. Duration obtained after the $N^{th}$ frame is prolonged each time needs to match a resolution that can be supported by an electronic device.

Optionally, the display includes a light-emitting diode. The third preset time T3 is the same as a period of a light-emitting control signal. The light-emitting control signal is used to control valid light-emitting duration of the light-emitting diode. In this way, when a time of a frame is prolonged, a refresh rate of the frame is also reduced. When the third preset time T3 is the same as the period of the light-emitting control signal, luminance of a display 10 remains unchanged when a resolution changes.

Optionally, the display driver further includes a frame buffer unit coupled to the transceiver unit, and the frame buffer unit is configured to buffer the display data received by the transceiver unit. The processing unit is specifically configured to: when the transceiver unit does not receive the $N^{th}$ frame of display data in the $(N+1)^{th}$ frame after the timing control unit sends the $S^{th}$ second pulse of the tearing effect signal, extract an $(N-1)^{th}$ frame of display data from the frame buffer unit, and control, based on the $(N-1)^{th}$ frame of display data, the display to display an $(N-1)^{th}$ frame of image. In this way, when the transceiver unit does not receive the $N^{th}$ frame of display data after the timing control unit sends the $S^{th}$ second pulse of the tearing effect signal, the timing control unit of the display driver enables a screen self-refresh mechanism, so that the $(N-1)^{th}$ frame of image can be repeatedly displayed, thereby avoiding a display interruption phenomenon on the display.

Optionally, the timing control unit is specifically configured to send the first pulse of the tearing effect signal or the second pulse of the tearing effect signal ahead of time by one time variation ΔT each time. The time variation ΔT is a difference between a time when the host receives data and a time when the host sends data. Therefore, time validity of data processing of an entire display control circuit system can be improved.

According to a second aspect of the embodiments of this application, a control method of a display driver is provided, where the method is used to drive a display to perform display, and the method includes: first, sending one first pulse of a tearing effect signal every a first preset time T1, where the first preset time T1=1/f1, and f1 is a first refresh rate of the display; where the first pulse of the tearing effect signal is used to indicate a host to output a generated $N^{th}$ frame of display data in an $(N+1)^{th}$ frame based on the first pulse of the tearing effect signal, where N is a positive integer; then, sending S second pulses of the tearing effect signal when the $N^{th}$ frame of display data is not received within a preset time, where the S second pulses of the tearing effect signal are used to prolong duration of the $N^{th}$ frame by a second preset time T2, and indicate the host to output the generated $N^{th}$ frame of display data in the $(N+1)^{th}$ frame based on an $S^{th}$ second pulse of the tearing effect signal, S is a positive integer, (T1+T2)≤(1/f2), f2 is a second refresh rate of the display, and the first refresh rate is greater than the second refresh rate; and then, receiving the $N^{th}$ frame of display data in the $(N+1)^{th}$ frame, and controlling, based on the $N^{th}$ frame of display data, the display to display an $N^{th}$ frame of image. The control method of the display driver has a same technical effect as the display driver provided in the foregoing embodiment, and details are not described herein again.

Optionally, the sending S second pulses of the tearing effect signal when the $N^{th}$ frame of display data is not received within a preset time includes: sending the second pulse of the tearing effect signal when it is determined, for M consecutive times every a third preset time T3 each time, that (T1+M×T3)=(1/f2). When the $S^{th}$ second pulse of the tearing effect signal is sent, the $N^{th}$ frame ends, and the duration of the $N^{th}$ frame is (T1+T2)=(1/f2), where M≥S, M is a positive integer, and M×T3=T2. Technical effects of sending the S second pulses of the tearing effect signal are the same as those described above, and details are not described herein again.

Optionally, the display includes a light-emitting diode. The third preset time T3 is the same as a period of a light-emitting control signal. The light-emitting control signal is used to control valid light-emitting duration of the light-emitting diode. Technical effects of duration of the third preset time T3 are the same as those described above, and details are not described herein again.

Optionally, the method further includes: when the $N^{th}$ frame of display data is not received in the $(N+1)^{th}$ frame after the $S^{th}$ second pulse of the tearing effect signal is sent, extracting an $(N-1)^{th}$ frame of display data, and controlling, based on the $(N-1)^{th}$ frame of display data, the display to display an $(N-1)^{th}$ frame of image, to enable a screen self-refresh mechanism and avoid interruption of a display image.

Optionally, the method further includes: sending the first pulse of the tearing effect signal or the second pulse of the tearing effect signal ahead of time by one time variation ΔT each time. The time variation ΔT is a difference between a time when the host receives data and a time when the host sends data. Technical effects of sending the first pulse of the tearing effect signal or the second pulse of the tearing effect signal ahead of time by one time variation ΔT are the same as those described above, and details are not described herein again.

According to a third aspect of the embodiments of this application, a display control circuit system is provided, and includes a display driver and a host coupled to the display driver. The display driver includes a timing control unit, a transceiver unit, and a processing unit. The timing control unit is configured to send one first pulse of a tearing effect signal every a first preset time T1, where the first preset time T1=1/f1, and f1 is a first refresh rate of a display. The first pulse of the tearing effect signal is used to indicate the host to output a generated $N^{th}$ frame of display data in an $(N+1)^{th}$ frame based on the first pulse of the tearing effect signal, where N is a positive integer. The transceiver unit is configured to receive the display data sent by the host. The timing control unit is further configured to send S second pulses of the tearing effect signal when the transceiver unit does not receive the $N^{th}$ frame of display data within a preset time, where the S second pulses of the tearing effect signal are used to prolong duration of the $N^{th}$ frame by a second preset time T2, and indicate the host to output the generated $N^{th}$ frame of display data in the $(N+1)^{th}$ frame based on an $S^{th}$ second pulse of the tearing effect signal, S is a positive integer, (T1+T2)≤(1/f2), f2 is a second refresh rate of the display, and the first refresh rate is greater than the second refresh rate. The processing unit is coupled to the transceiver unit, and is configured to: receive the $N^{th}$ frame of display data in the $(N+1)^{th}$ frame, and control, based on the $N^{th}$ frame of display data, the display to display an $N^{th}$ frame of image. The host is configured to output the generated $N^{th}$ frame of display data in the $(N+1)^{th}$ frame based on the first pulse or the second pulse of the tearing effect signal. The display control circuit system has a same technical effect as the display driver provided in the foregoing embodiment, and details are not described herein again.

Optionally, the timing control unit is specifically configured to send the second pulse of the tearing effect signal when it is determined, for M consecutive times every a third preset time T3 each time, that (T1+M×T3)=(1/f2). When the $S^{th}$ second pulse of the tearing effect signal is sent, the $N^{th}$ frame ends, and the duration of the $N^{th}$ frame is (T1+T2)=(1/f2), where M≥S, M is a positive integer, and M×T3=T2. Technical effects of sending the S second pulses of the tearing effect signal are the same as those described above, and details are not described herein again.

Optionally, the display includes a light-emitting diode. The third preset time T3 is the same as a period of a light-emitting control signal. The light-emitting control signal is used to control valid light-emitting duration of the light-emitting diode. Technical effects of duration of the third preset time T3 are the same as those described above, and details are not described herein again.

Optionally, the display driver further includes a frame buffer unit coupled to the transceiver unit, and the frame buffer unit is configured to buffer the display data received by the transceiver unit. The processing unit is specifically configured to: when the transceiver unit does not receive the $N^{th}$ frame of display data in the $(N+1)^{th}$ frame after the timing control unit sends the $S^{th}$ second pulse of the tearing effect signal, extract an $(N-1)^{th}$ frame of display data from the frame buffer unit, and control, based on the $(N-1)^{th}$ frame of display data, the display to display an $(N-1)^{th}$ frame of image. Therefore, a screen self-refresh mechanism can be enabled, and an interruption of a display image can be avoided.

Optionally, the timing control unit is specifically configured to send the first pulse of the tearing effect signal and the second pulse of the tearing effect signal ahead of time by one time variation ΔT each time. The time variation ΔT is a difference between a time when the host receives data and a time when the host sends data. Technical effects of sending the first pulse of the tearing effect signal or the second pulse of the tearing effect signal ahead of time by one time variation ΔT are the same as those described above, and details are not described herein again.

Optionally, the host includes an image processing unit, a storage unit, and a display engine unit. The image processing unit is configured to: generate the $N^{th}$ frame of display data, and send the $N^{th}$ frame of display data when generating an $(N+1)^{th}$ frame of display data, where N is a positive integer. The storage unit is coupled to the image processing unit, and is configured to store the $N^{th}$ frame of display data generated by the image processing unit. The display engine unit is coupled to the display driver and the storage unit, and is configured to output the $N^{th}$ frame of display data stored in the storage unit to the display driver in the $(N+1)^{t}$ frame based on the first pulse or the second pulse of the tearing effect signal. The image processing unit in the host may generate each frame of display image, and store the display image in the storage unit. When receiving the first pulse or the second pulse of the tearing effect signal, the display engine unit may send the display image stored in the storage unit to the display driver in a form of a data packet, so that the display driver can drive, based on the display data, the display to perform display.

According to a fourth aspect of the embodiments of this application, an electronic device is provided, and includes a display and the display control circuit system described above. The display driver in the display control circuit system is coupled to the display, and is configured to drive the display to perform display. The electronic device has a same technical effect as the display driver circuit system provided in the foregoing embodiment, and details are not described herein again.

According to a fifth aspect of the embodiments of this application, a computer-readable storage medium is provided, where the computer-readable storage medium stores a computer program, and when the computer program is executed by a processor, any one of the foregoing methods is implemented. The computer-readable storage medium has a same technical effect as the control method of the display driver provided in the foregoing embodiment, and details are not described herein again.

REFERENCE NUMERALS

10—Display; 100—AA area; 101—Non-display area; 20—Subpixel; 201—Pixel circuit; 01—Electronic device; 30—Display driver; 301—Timing control unit; 302—Processing unit; 303—Transceiver unit; 304—Frame buffer unit; 40—Host; 401—GPU; 402—Display engine unit; 403—Storage unit; and 50—Light-emitting control circuit.

DETAILED DESCRIPTION OF ILLUSTRATIVE EMBODIMENTS

The following describes the technical solutions in the embodiments of this application with reference to the accompanying drawings in the embodiments of this application. Apparently, the described embodiments are merely a part rather than all of the embodiments of this application.

The following terms "first", "second", and the like are merely intended for a purpose of description, and shall not be understood as an indication or implication of relative importance or implicit indication of a quantity of indicated technical features. Therefore, a feature limited by "first" or "second" may explicitly or implicitly include one or more features. In the description of this application, unless otherwise stated, "a plurality of" means two or more than two.

In addition, in this application, direction terms such as "top", "bottom", "left", and "right" may include but are not limited to those defined relative to schematic locations of parts shown in the accompanying drawings. It should be understood that these directional terms are relative concepts and are used for relative description and clarification, and may correspondingly change based on a change in the locations of the parts shown in the accompanying drawings.

In this application, unless otherwise specified and limited, the term "coupling" may be a manner of implementing an electrical connection of signal transmission. "Coupling" should be understood broadly. For example, "coupling" may be a direct electrical connection, or may be an indirect electrical connection via an intermediate medium.

Figure 1A:
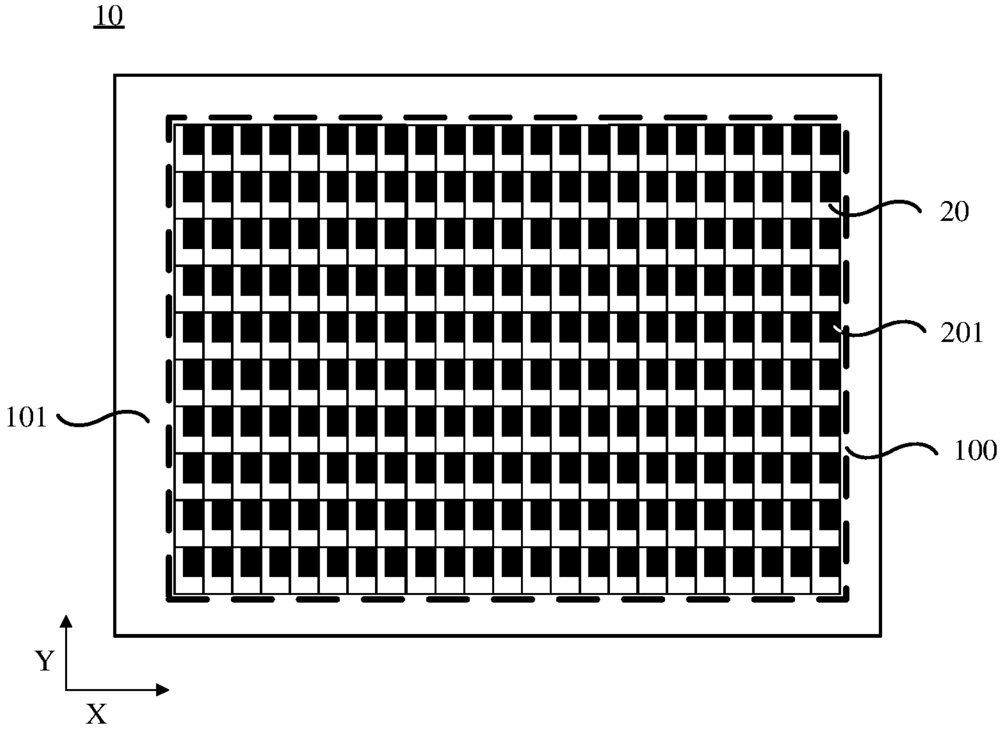
FIG. 1*a* is a schematic structural diagram of a display according to some embodiments of this application.

An embodiment of this application provides an electronic device, and the electronic device includes, for example, a television set, a mobile phone, a tablet computer, a palmtop computer, and a vehicle-mounted computer. A specific form of the electronic device is not specially limited in the embodiments of this application. As shown in FIG. 1*a*, the electronic device includes a display 10 configured to display an image.

In some embodiments, the display 10 may be a liquid crystal display (liquid crystal display, LCD). In this case, the electronic device further includes a backlight module configured to provide a light source for the display 10. Alternatively, in some other embodiments, the display 10 may be an organic light emitting diode (organic light emitting diode, OLED) display, and the OLED display can implement self-emission.

For any type of the foregoing displays 10, the display 10 includes an active display area (active area, AA) 100 and a non-display area 101 around the AA area 100. The AA area 100 is used to display an image. The AA area 100 includes a plurality of subpixels (sub pixel) 20. For ease of description, the plurality of subpixels 20 in this application are described by using matrix arrangement as an example.

It should be noted that in this embodiment of this application, a row of subpixels 20 arranged in a horizontal direction X are referred to as a same row of subpixels, and a row of subpixels 20 arranged in a vertical direction Y are referred to as a same column of subpixels.

Figure 1B:
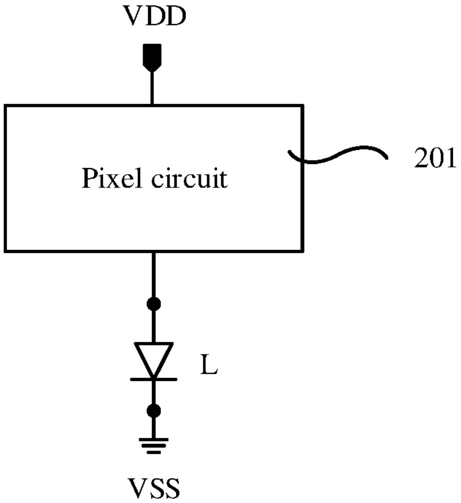
FIG. 1*b* is a schematic structural diagram of a pixel circuit and a light-emitting component in each subpixel in FIG. 1*a;*

A pixel circuit 201 configured to control display of the subpixel 20 is disposed in the subpixel 20 in the AA area 100. When the display 10 is an OLED display, the subpixel 20 further includes a light-emitting component L (as shown in FIG. 1*b*) coupled to the pixel circuit 201. The light-emitting component L is an OLED, an anode (anode, a for short) of the light-emitting component L is coupled to the pixel circuit 201, and a cathode (cathode, c for short) of the light-emitting component L is coupled to a voltage end VSS. The pixel circuit 201 is configured to drive the light-emitting component OLED to emit light.

Figure 1C:
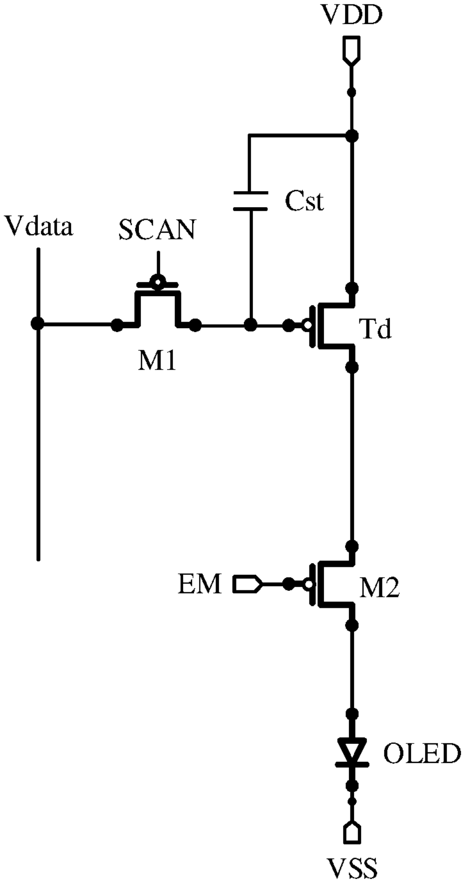
FIG. 1*c* is a schematic diagram of a partial structure of a pixel circuit in FIG. 1*b;*

The pixel circuit 201 includes a plurality of switching transistors (for example, a transistor M1 and a transistor M2 shown in FIG. 1*c*) and one drive transistor (for example, a transistor Td shown in FIG. 1*c*). When some switching transistors such as the transistor M1 are conducted, a data voltage Vdata may be written to the drive transistor Td, so that magnitude of a drive current I generated by the drive transistor Td is related to the data voltage Vdata. For example, $I=\frac{1}{2}\times\mu\times Cgi\times W/L\times(Vsg-|Vth|)^2$, where μ is a carrier mobility of the drive transistor M4, Cgi is a capacitance between a gate of the drive transistor M4 and a channel, W/L is a width-to-length ratio of the drive transistor M4, and Vth is a threshold voltage of the drive transistor M4. In addition, the pixel circuit 201 further includes a capacitor Cst shown in FIG. 1*c*.

When the light-emitting component L is an OLED, the light-emitting component L is a current light-emitting component. Therefore, by controlling magnitude of the data voltage Vdata, the magnitude of the drive current I can be controlled, so that after the drive current I flows through the light-emitting component L, light-emitting luminance of the light-emitting component L can be controlled.

In addition, after the drive transistor Td is conducted, some switching transistors such as the transistor M2 in the pixel circuit 201 may control an on/off state of a current path formed between a voltage end VDD and the voltage end VSS, to control whether the drive current I can flow into the light-emitting component L. As shown in FIG. 1*c*, a gate of the transistor M2 is coupled to a light-emitting control signal EM. The light-emitting control signal EM is a square wave signal.

In this way, in a pulse width modulation (pulse width modulation) manner, a duty ratio (duty ratio) of the light-emitting control signal EM may be controlled, to control valid conduction duration of the current path formed between the voltage end VDD and the voltage end VSS in each frame, in other words, valid duration in which the drive current I flows through the light-emitting component L, thereby controlling light-emitting luminance of the light-emitting component L.

Figure 2:
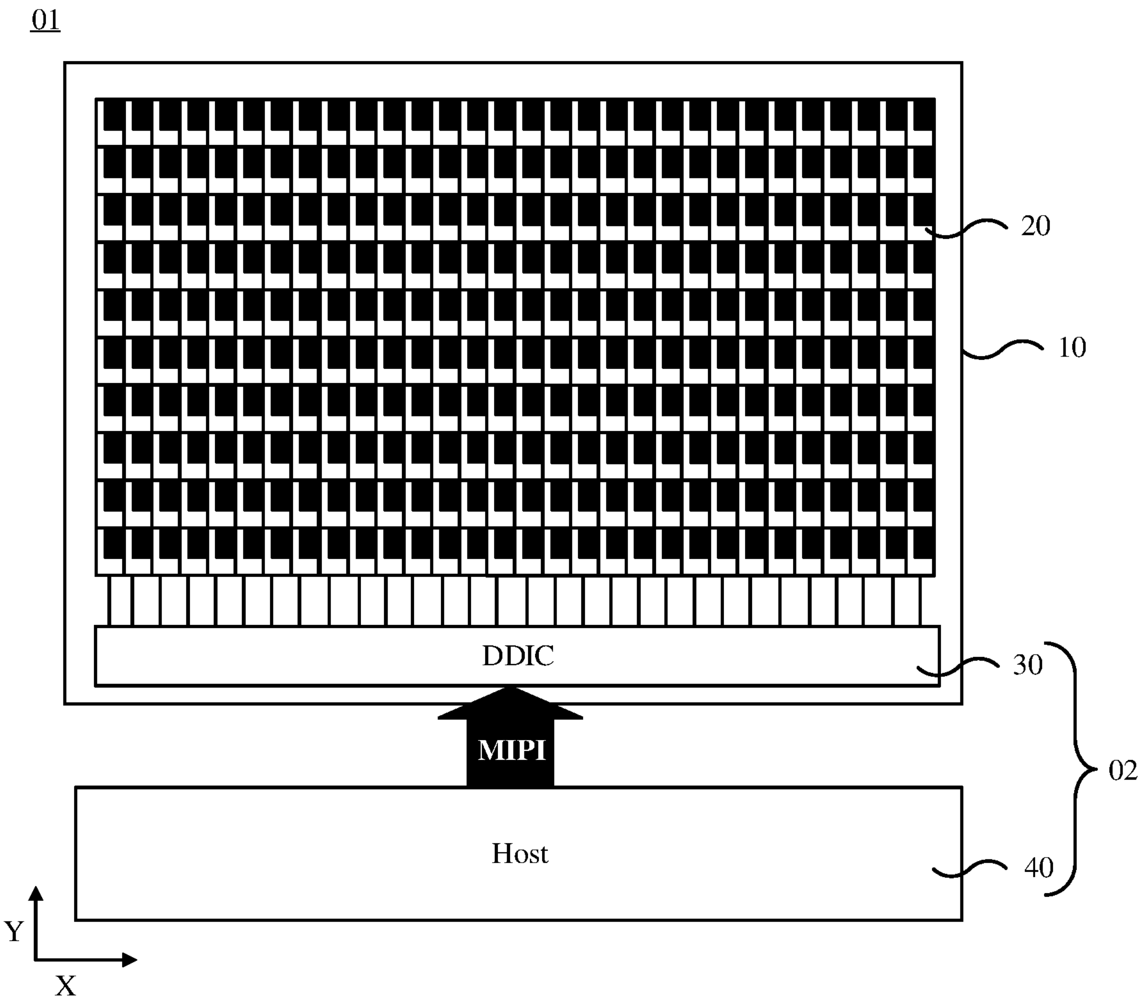
FIG. 2 is a schematic structural diagram of an electronic device according to some embodiments of this application.

It may be learned from the foregoing descriptions that, to provide the data voltage Vdata for the pixel circuit 201 in each subpixel 20, the electronic device 01 further includes a display control circuit system 02. The display control circuit system 02 includes a display driver 30 shown in FIG. 2 and a host 40 coupled to the display driver 30.

In some embodiments of this application, the display driver 30 may be a display driver integrated circuit (display driver IC, DDIC). In this case, the display driver 30 may be bonded (bonding) on the display 10 by using a pad disposed in the non-display area 101 of the display 10. In addition, the display driver 30 may use a mobile industry processor interface (mobile industry processor interface, MIPI) or another serial/deserial (serial/deserial, SerDes) high-speed interface. For ease of description, an MIPI interface is used as an example below for description. The MIPI interface is coupled to the host 40. In addition, in some embodiments of this application, the host 40 may be an integrated circuit, a system on a chip (system on a chip, SoC), an application processor (application processor, AP), or a processor.

Figure 3:
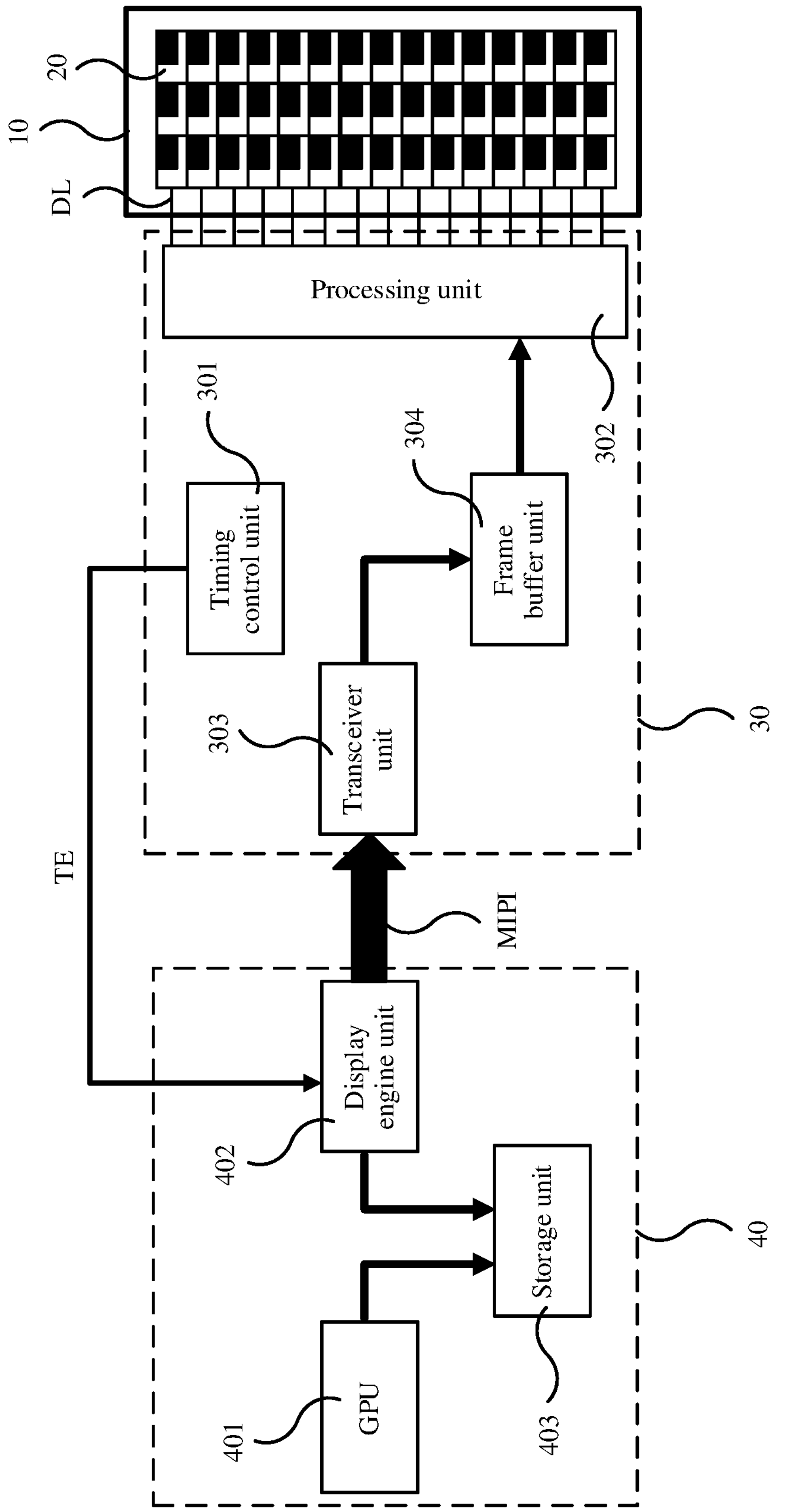
FIG. 3 is a schematic structural diagram of a display control circuit system in FIG. 2.

In this case, when the electronic device transmits display data in a command mode, the display driver 30 includes a timing control unit (timing controller, TCON) 301, a transceiver unit 303, and a processing unit 302 shown in FIG. 3.

Figure 4:
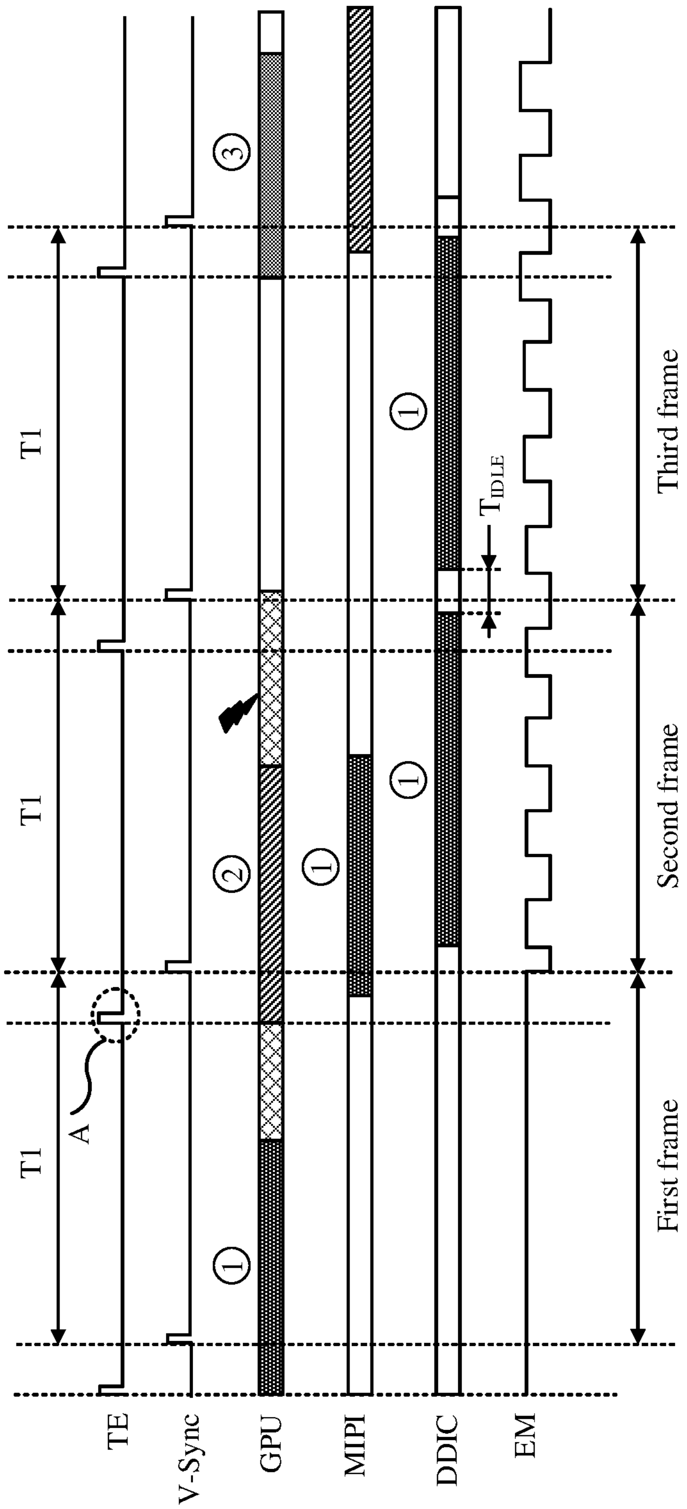
FIG. 4 is a schematic diagram of a timing signal of an electronic device according to a related art.

The timing control unit 301 is configured to send, every a first preset time T1, one first pulse A of a tearing effect (tearing effect, TE) signal shown in FIG. 4, where the first pulse A is a high level, and the high level is used as a valid signal of the TE signal.

The first preset time T1=1/f1, and f1 is a first refresh rate of the display 10. For example, the first refresh rate may be a highest refresh rate of the display 10, for example, 120 Hz. For example, the first refresh rate f1=120 Hz, and the first preset time T1=1/f1=1/120=8.33 ms. The first pulse A of the TE signal is used to indicate the host 40 to output, in an $(N+1)^{th}$ frame (for example, a second frame), a generated $N^{th}$ frame (for example, a first frame when N=1) of display data based on the first pulse A of the TE signal. N is a positive integer.

In addition, as shown in FIG. 3, the host 40 includes a graphics processing unit (graphics processing unit, GPU) 401. The GPU 401 may generate the $N^{th}$ frame (for example, the first frame) of display data through data rendering (rendering) and programming (programming) processing. Based on this, the host 40 may further include a display engine (display engine) unit 402 and a storage unit 403 that is coupled to the GPU 401 and the display engine unit 402. In some embodiments of this application, the storage unit 403 may be a double data rate synchronous dynamic random access memory (double data rate synchronous dynamic random access memory, DDR SDRAM) or a system memory (SRAM). The storage unit 403 is coupled to the GPU 401, and the storage unit 403 is configured to store display data generated by the GPU 401, for example, store the first frame of display data.

In addition, the display engine unit 402 is coupled to the storage unit 403. In addition, the display engine unit 402 may be further coupled to the timing control unit 301 in the display driver 30 by using a high-speed interface such as the foregoing MIPI interface. The display engine unit 402 is configured to receive a TE signal sent by the timing control unit 301, and based on the TE signal, the display engine unit 402 may extract, for data processing, the $N^{th}$ frame (for example, the first frame) of display data (represented by ① in FIG. 4) generated by the GPU 401 and stored in the storage unit 403, use, as an $N^{th}$ frame (for example, the first frame) of data packet, data packed into a display command set (display command set, DCS), and send the $N^{th}$ frame of data packet to the display driver 30 through the MIPI interface.

It should be noted that in the accompanying drawings of the embodiments of this application, for example, display data (for example, a first frame of display data ①) generated by each GPU 401 in FIG. 4 is represented by using two rectangles padded with patterns. In a process in which the GPU 401 generates the display data, a first segment of rectangle from left to right represents a data rendering process, and a second segment of rectangle represents a process in which the GPU 401 performs programming processing.

Then, in the $(N+1)^{th}$ frame (for example, the second frame when N=1), the GPU 401 generates a second frame of display data. The transceiver unit 303 in the display driver 30 may receive, through the MIPI interface, the foregoing $N^{th}$ frame (for example, the first frame) of DCS data packet sent by the display engine unit 402. Based on this, when the display driver 30 further includes a frame buffer (frame buffer) unit 304 coupled to the transceiver unit 303, the transceiver unit 303 may buffer the $N^{th}$ frame (for example, the first frame) of DCS data packet into the frame buffer unit 304.

At the same time, in the $(N+1)^{th}$ frame (for example, the second frame when N=1), the processing unit 302 may extract the $N^{th}$ frame (for example, the first frame) of DCS data packet from the frame buffer unit 304, and generate, based on the $N^{th}$ frame (for example, the first frame) of DCS data packet, the data voltage Vdata used to control display of each subpixel 20.

In some embodiments of this application, the processing unit 302 may include a data processing unit (process IP) and a source circuit (source circuit). The data processing unit (process IP) may perform data decompression, image processing, image gamma (gamma) value adjustment, and the like on the DCS data packet. The source circuit (source circuit) may generate, based on data output by the data processing unit (process IP), the data voltage Vdata used to control display of each subpixel 20.

Based on this, each time the first pulse A of the TE signal is sent, the timing control unit 301 in the display driver 30 receives an externally input vertical synchronization signal (V-Sync) shown in FIG. 4. In this case, the display driver 30 scans the subpixels 20 row by row (in an X direction) from a first row of subpixels 20 to conduct some transistors in the pixel circuit 201 of each subpixel 20, for example, the transistor M1 in FIG. 1.

In this way, after a row of sub-pixels 20 are scanned, the data voltage Vdata that is generated by the display driver 30 and that is used to control display of each subpixel 20 is transmitted to the pixel circuit 201 of each subpixel 20 by using a data line (data line, DL) shown in FIG. 3. The data voltage Vdata is written to the drive transistor Td by using a conducted transistor M1. Therefore, the drive transistor Td of the pixel circuit 201 can generate the drive current I that is used to drive the light-emitting component L to emit light.

Figure 5:
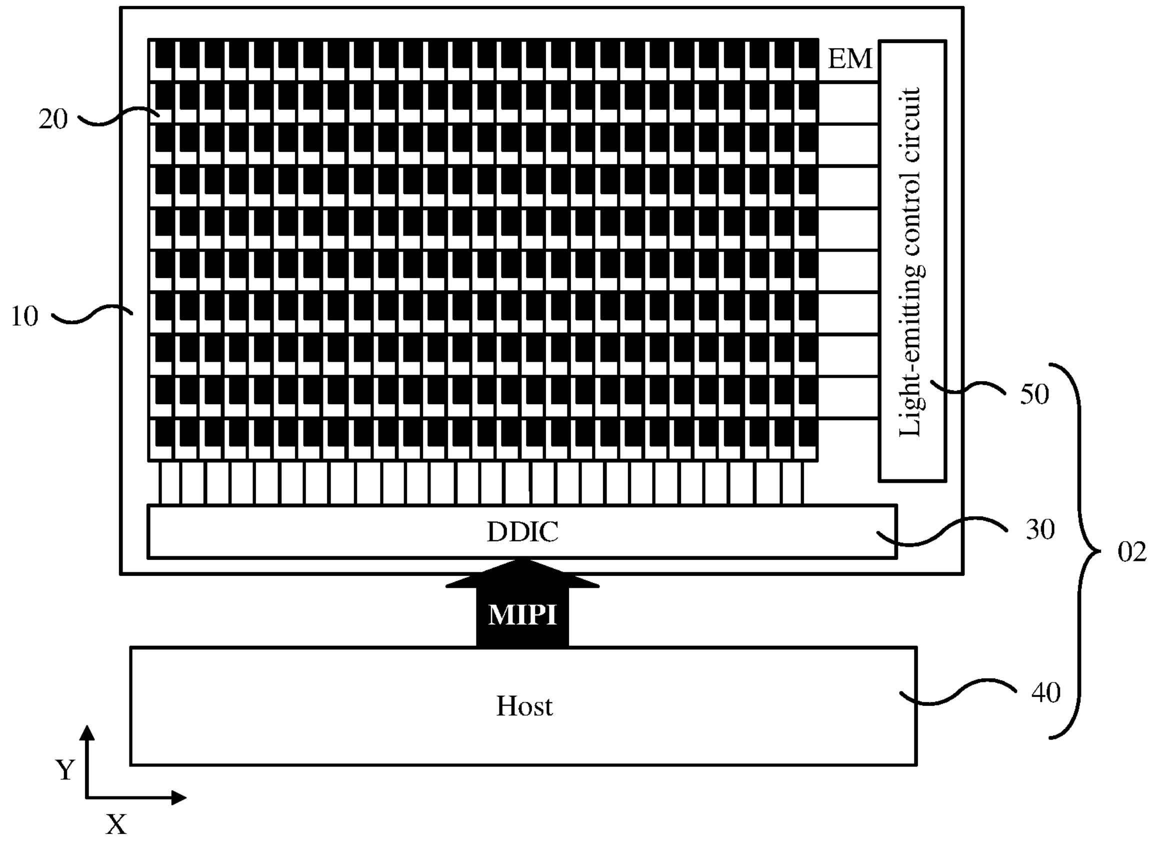
FIG. 5 is a schematic structural diagram of another electronic device according to some embodiments of this application.

Based on this, it may be learned from the foregoing descriptions that, light-emitting luminance of the light-emitting component L can be further controlled by controlling the valid duration in which the drive current I flows through the light-emitting component L. In this case, the display control circuit system 02 of the electronic device may further include a light-emitting control circuit 50 shown in FIG. 5. The light-emitting control circuit 50 may be integrated into the non-display area 101 of the display 10 by using a gate driver on array (gate driver on array, GOA) technology.

The light-emitting control circuit 50 may provide the light-emitting control signal EM shown in FIG. 4 for gates of some transistors (for example, the transistor M2 in FIG. 1*c*) in the pixel circuits 201 of the subpixels 20 row by row. Therefore, when the light-emitting control signal EM is at a high level (for example, the high level is a valid signal) as shown in FIG. 4, the current path formed between the voltage end VDD and the voltage end VSS in FIG. 1 is conducted, to control the valid duration in which the drive current I flows into the light-emitting component L. In this way, the display driver 30 obtains, through the MIPI interface, the DCS data packet sent by the display engine unit 402 in the host 40, to obtain the data voltage Vdata, so that the display 10 can be controlled to display an $N^{th}$ (for example, N=1) frame of image by using the data voltage Vdata and with reference to adjustment of the duty ratio of the light-emitting control signal EM.

In conclusion, the GPU 401 first generates the $N^{th}$ frame of display data. Then, at the same time of generating the $(N+1)^{th}$ frame of display data, the GPU 401 stores the $N^{th}$ frame of display data in the storage unit 403. At the same time, the display engine unit 402 extracts the $N^{th}$ frame of display data from the storage unit 403, generates the $N^{th}$ frame of DCS data packet, and sends the $N^{th}$ frame of DCS data packet to the transceiver unit 303 of the display driver 30 through the MIPI interface. The transceiver unit 303 may buffer the $N^{th}$ frame of DCS data packet into the frame buffer unit 304. The processing unit 302 extracts the $N^{th}$ frame of DCS data packet from the frame buffer unit 304, and drives the display 10 to display the $N^{th}$ frame of image.

In this case, when the timing control unit 301 in the display driver 30 sends a first first pulse A (a first high-level pulse signal shown in FIG. 4) of the TE signal to the display engine unit 402 in the host 40, the GPU 401 generates the first frame of display data within a time of the first frame. In this case, the display engine unit 402 cannot extract the first frame of display data from the storage unit 403. Therefore, the subpixels 20 in the display 10 are scanned row by row even under the action of a first high level of V-Sync. However, because the MIPI interface and the display driver 30 (for example, the DDIC) are in an idle (IDLE) state, and the light-emitting control signal EM does not send a valid signal, the display 10 does not display an image.

Then, when the timing control unit 301 in the display driver 30 sends a second first pulse A (a second high-level pulse signal shown in FIG. 4) of the TE signal to the display engine unit 402 in the host 40, at the same time of generating a second frame of display data, the GPU 401 stores the first frame of display data in the storage unit 403. The display engine unit 402 extracts the first frame of display data from the storage unit 403, generates a first frame of DCS data packet, and buffers the first frame of DCS data packet ① into the frame buffer unit 304 through the MIPI interface. The processing unit 302 in the display driver 30 may extract the first frame of DCS data packet ① from the frame buffer unit 304, and generate the data voltage Vdata. In the second frame shown in FIG. 4, the light-emitting control signal EM sends a valid square wave signal. In addition, under the action of a second high level of V-Sync, the subpixels 20 in the display 10 are scanned row by row, to control the light-emitting component L in each subpixel 20 to emit light, and the display 10 displays the first frame of image.

Similarly, it may be learned that, when the timing control unit 301 in the display driver 30 sends another first pulse A of the TE signal to the display engine unit 402 in the host 40, at the same time of generating a third frame of display data, the GPU 401 stores the second frame of display data in the storage unit 403. The display engine unit 402 extracts the second frame of display data from the storage unit 403, generates a second frame of DCS data packet, and buffers the second frame of DCS data packet ② into the frame buffer unit 304 through the MIPI interface. In addition, after a preset idle time $T_{IDLE}$, the processing unit 302 in the display driver 30 obtains the second frame of DCS data packet ② from the frame buffer unit 304, to control the display 10 to display a second frame of image in the third frame shown in FIG. 4.

It should be noted that a length of the preset idle time $T_{IDLE}$ is related to performance and data processing speeds of the GPU 401 and the display driver 30. In this application, the length of the preset idle time $T_{IDLE}$ is not limited, provided that it can be ensured that the processing unit 302 in the display driver 30 can control, after a preset idle time $T_{IDLE}$ of the $(N+1)^{th}$ frame (for example, the third frame) based on the $N^{th}$ frame (for example, the second frame) of DCS data packet ② obtained from the frame buffer unit 304, the display 10 to normally display the $N^{th}$ frame (for example, the second frame) of image.

However, in a current related art, when the electronic device displays a relatively complex dynamic image, for example, when a user plays a large game, the GPU 401 cannot generate the second frame of display data in one frame, for example, the second frame (in other words, T1=8.33 ms) shown in FIG. 4. Therefore, the GPU 401 cannot store, in the third frame, the second frame of display data in the storage unit 403 at the same time of generating the third frame of display data. Therefore, in the third frame in FIG. 4, data in the storage unit 403 cannot be updated.

In this way, when entering the third frame after the timing control unit 301 in the display driver 30 sends a third first pulse A of the TE signal to the display engine unit 402 in the host 40, the GPU 401 still performs, in the third frame, an action of generating the second frame of display data, and therefore, the storage unit 403 still caches the first frame of display data. Therefore, in the third frame, the display engine unit 402 cannot send the second frame of DCS data packet ② to the transceiver unit 303 in the display driver 30 (for example, the DDIC) through the MIPI interface. Therefore, as shown in FIG. 4, the MIPI interface is in the IDLE state in the third frame.

In this case, as shown in FIG. 4, in the third frame, the processing unit 302 in the display driver 30 (for example, the DDIC) may control, based on the first frame of DCS data packet ① buffered in the frame buffer unit 304 in the second frame, the display 10 to repeatedly display the first frame of image. Therefore, when the electronic device displays the complex image, a same image is repeatedly displayed in two adjacent frames, and an image stalling phenomenon occurs.

Figure 6:
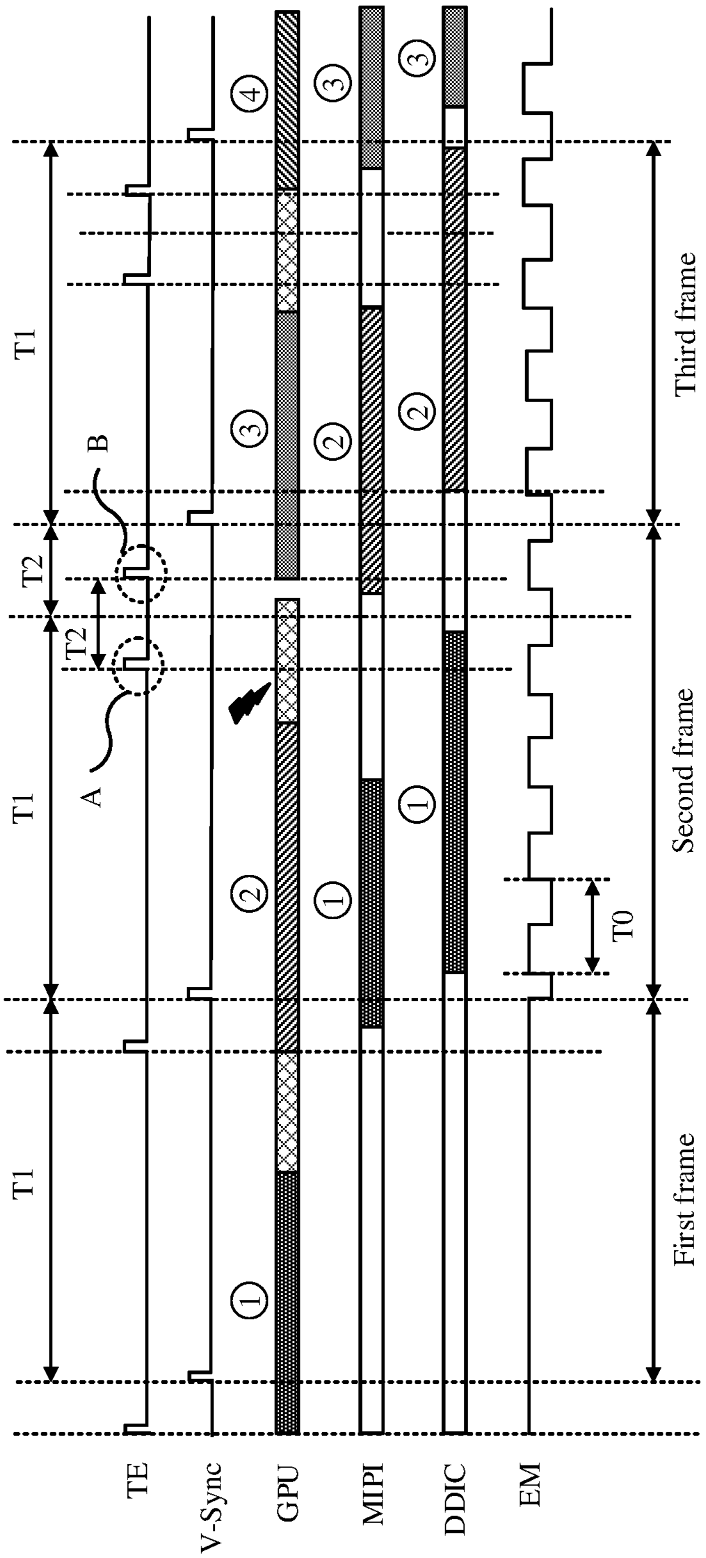
FIG. 6 is a schematic diagram of a timing signal of an electronic device according to some embodiments of this application.

To resolve the foregoing problem, when the transceiver unit 303 in the display driver 30 does not receive the $N^{th}$ frame (for example, the second frame) of display data (in other words, the second frame of DCS data packet ②) within a preset time (for example, after the preset idle time $T_{IDLE}$ in FIG. 4), the timing control unit 301 in the display driver 30 provided in this embodiment of this application may send S (for example, S=1) second pulses B of the TE signal (as shown in FIG. 6). The second pulse B is a high level, and the high level is used as a valid signal of the TE signal. S is a positive integer.

As shown in FIG. 6, the S (for example, S=1) second pulses B of the TE signal are used to prolong duration of the $N^{th}$ frame (for example, the second frame) by a second preset time T2 and indicate the host 40 to output, in the $(N+1)^{th}$ frame (for example, the third frame) based on an $S^{th}$ second pulse B of the TE signal, the generated $N^{th}$ frame (for example, the second frame) of display data (in other words, the second frame of DCS data packet ②).

In this case, the duration of the second frame is T1+T2. (T1+T2)≤(1/f2), f2 is a second refresh rate of the display 10, and the first refresh rate f1 is greater than the second refresh rate f2. For example, the first refresh rate f1=120 Hz, and the second refresh rate f2=96 Hz. In this case, T1=1/f1=8.33 ms, (T1+T2)=(8.33 ms+T2), and 1/f2=10.41 ms. Therefore, (8.33 ms+T2)≤10.41 ms.

In this way, when the electronic device displays a relatively complex dynamic image, the timing control unit 301 in the display driver 30 may send one second pulse B of the TE signal to the display engine unit 402 although a second first preset time T1 (for example, T1=8.33 ms) is exceeded when the GPU 401 generates the second frame of display data, as shown in FIG. 6. A time interval between the second pulse B of the TE signal and a third first pulse A of the TE signal may be the foregoing second preset time T2. In this case, a third high-level pulse of V-Sync is also prolonged by the second preset time T2, so that the second frame can be prolonged to T1+T2. It is ensured that the GPU 401 completes a process of generating the second frame of display data within a time T1+T2 (in other words, in the second frame on which prolonging processing is performed).

Based on this, in the second frame, the GPU 401 has generated the second frame of display data. Therefore, in the third frame shown in FIG. 6, at the same time of generating the third frame of display data, the GPU 401 may store the second frame of display data in the storage unit 403 in the host 40. Then, in the third frame shown in FIG. 6, the display engine unit 402 may send the second frame of DCS data packet ② to the transceiver unit 303 through the MIPI interface based on the S'h (for example, the first) second pulse B of the TE signal, and buffer the second frame of DCS data packet ② into the frame buffer unit 304 by using the transceiver unit 303. Then, the processing unit 302 in the display driver 30 may control, based on the second frame DCS data packet ②, the display 10 to display the $N^{th}$ frame (for example, the second frame) of image in the third frame shown in FIG. 6.

In conclusion, when a time used by the GPU 401 to generate one frame (for example, the second frame) of display data exceeds a time interval between two adjacent first pulses of the TE signal, for example, the first preset time T1, in other words, exceeds duration (for example, T1=1/f1=1/120 Hz=8.33 ms) of each frame of image corresponding to a resolution (for example, a first resolution f1=120 Hz) of the display, one second pulse B may be regenerated by using the TE signal, to prolong duration of the frame to T1+T2, so that the GPU 401 can generate the second frame of display data in the second frame. Further, in the third frame, the processing unit 302 may control, based on the second frame of display data buffered in the frame buffer unit 304, the display 10 to display the second frame of image. In this way, in the third frame, the display driver 30 (for example, the DDIC) does not extract, because the display driver 30 cannot receive the second frame of image, the first frame of image from the frame buffer unit 304 to control the display 10 to repeatedly display the first frame of image. In this way, a probability of image stalling can be reduced.

It can be learned from the foregoing descriptions that duration of each frame is the first preset time T1 provided that the time used by the GPU 401 to generate one frame of display data is within the first preset time T1, in other words, a resolution of normal display of the display 10 is 1/T1=120 Hz. When the time used by the GPU 401 to generate one frame (for example, the second frame) of display data exceeds the first preset time T1, a pulse signal, in other words, one second pulse B may be regenerated by using the TE signal, to prolong duration of the frame to T1+T2. Therefore, a resolution of the second frame is reduced from 1/T1=120 Hz to 1/(T1+T2).

In addition, it can be learned from the foregoing descriptions that, the duty ratio of the light-emitting control signal EM signal may be adjusted to adjust the light-emitting luminance of the display 10. Therefore, to ensure that display luminance of the display 10 remains unchanged when a resolution changes, a phase (referred to as a V-Porch phase whose duration is T2 below) increased in the TE signal needs to include an integer multiple of a period T0 of the light-emitting control signal EM when one second pulse B of the TE signal is regenerated. In this way, the increased V-Porch phase does not change the duty ratio of the light-emitting control signal EM, so that the light-emitting luminance of the display 10 can remain unchanged when the resolution changes.

Descriptions are provided above by using an example in which when a time used by the GPU 401 to generate the $N^{th}$ frame (for example, the second frame) of display data exceeds the first preset time T1, one second pulse B is regenerated by using the TE signal to prolong the duration of the $N^{th}$ frame (for example, the second frame) so that the GPU 401 generates the second frame of display data.

In some other embodiments of this application, when the transceiver unit 303 in the display driver 30 does not receive the $N^{th}$ frame (for example, the second frame) of display data within a preset time (for example, after the preset idle time $T_{IDLE}$) after one second pulse B is regenerated for the TE signal, the timing control unit 301 in the display driver 30 may continue to regenerate the second pulse B of the TE signal until the duration of the $N^{th}$ frame (for example, the second frame) is prolonged so that the GPU 401 can generate the second frame of display data. Duration obtained after the duration of the $N^{th}$ frame (for example, the second frame) is prolonged each time needs to match a resolution that can be supported by the electronic device 01.

Figure 7:
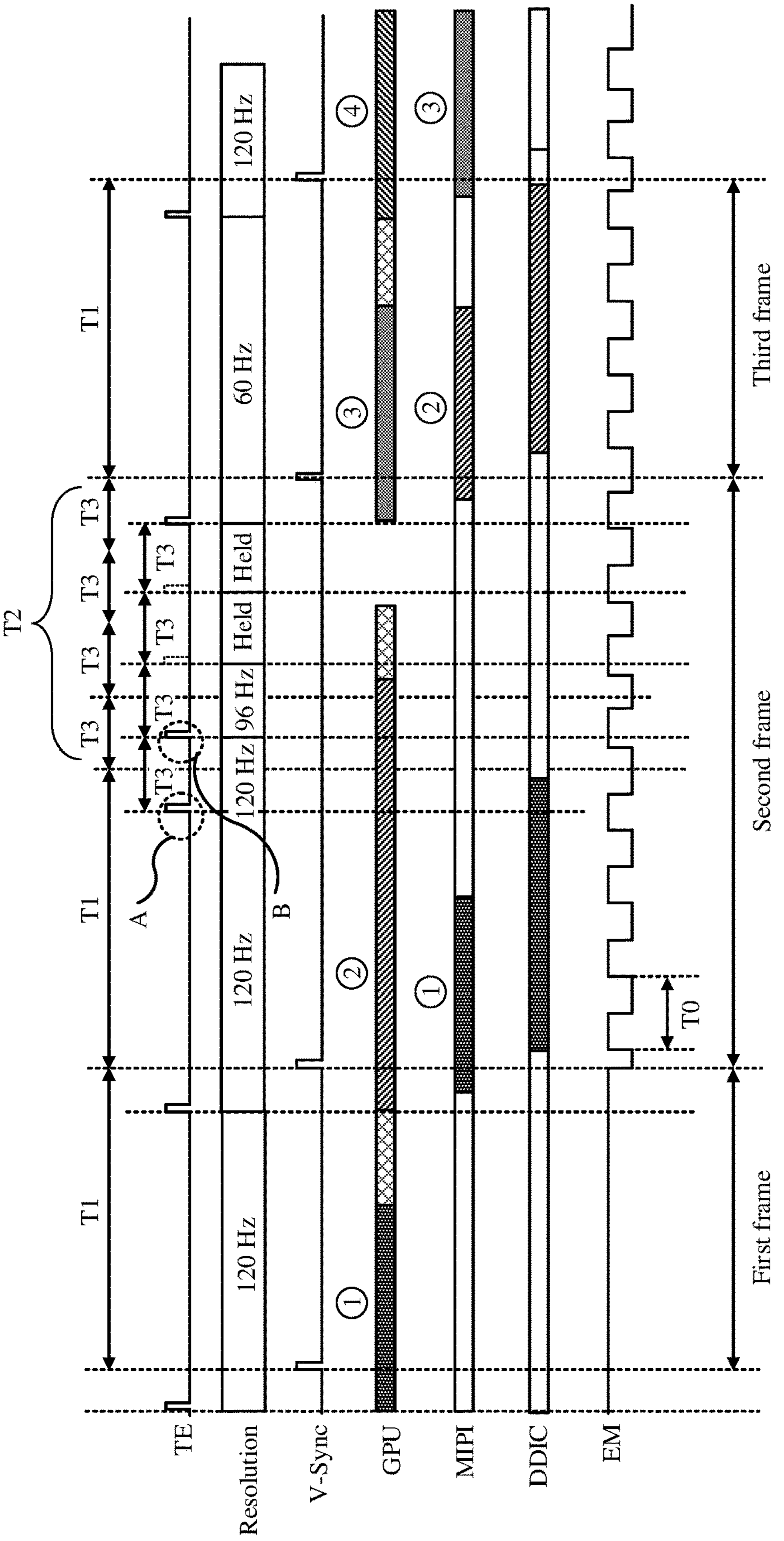
FIG. 7 is a schematic diagram of another timing signal of an electronic device according to some embodiments of this application.

For example, when the time used by the GPU 401 to generate the $N^{th}$ frame (for example, the second frame) of display data exceeds the first preset time T1, the timing control unit 301 in the display driver 30 may send the second pulse B of the TE signal when determining, for M consecutive times every the third preset time T3 each time, that (T1+M×T3)=(1/f2), as shown in FIG. 7. M≥S, M is a positive integer, and M×T3=T2.

For example, resolutions that can be supported by the electronic device 01 include: a maximum resolution 120 Hz, a minimum resolution 60 Hz, and an intermediate resolution 96 Hz. The maximum resolution may be the first refresh rate f1=120 Hz, and the first preset time T1=1/f=8.33 ms.

When a time used by the GPU 401 in the host 40 to generate the first frame of display data is within the first preset time T1, it may be learned from the foregoing descriptions that the display engine unit 402 in the host 40 may transmit, in the second frame, the first frame of DCS data packet ① to the display driver 30 through the MIPI interface, and the display driver 30 controls, based on the first frame of DCS data packet ①, the display 10 to perform display.

In addition, as shown in FIG. 7, in the second frame, a time used by the GPU 401 in the host 40 to generate the second frame of display data exceeds the first preset time T1. In this case, the timing control unit 301 in the display driver 30 may first determine, at an interval of one third preset time T3, whether (T1+T3) is the same as a period (1/f2=10.41 ms) corresponding to a second resolution (for example, the intermediate resolution 96 Hz), in other words, determine whether (T1+T3) is equal to 10.41 ms.

It can be learned from the foregoing descriptions that when a time of a frame is prolonged, a refresh rate of the frame is also reduced. To ensure that luminance of the display 10 remains unchanged when the resolution changes, a time by which the second frame is prolonged each time, in other words, the third preset time T3 may be the same as the period T0 (T0=T1/4=2.08 ms) of the light-emitting control signal EM. In this case, T1+T3=8.33 ms+2.08 ms=10.41 ms=1/f2. In this case, the timing control unit 301 in the display driver 30 sends the second pulse B of the TE signal, to prolong the duration of the second frame to T1+T3. In the second frame, a refresh rate of the display 10 is reduced from a highest refresh rate 120 Hz to the intermediate resolution 96 Hz as the duration of the second frame is prolonged.

Based on this, as shown in FIG. 7, when the time used by the GPU 401 to generate the $N^{th}$ frame (for example, the second frame) of display data exceeds T1+T3, the timing control unit 301 in the display driver 30 may add one third preset time T3, and determine that (T1+2×T3)=(8.33 ms+2×2.08 ms)=12.5 ms, and 12.5 ms is different from a period (1/f2=16.67 ms) corresponding to the second resolution (in this case, the second resolution is the minimum resolution 60 Hz). The timing control unit 301 in the display driver 30 does not send the second pulse of the TE signal, but is in a held state.

Then, the timing control unit 301 in the display driver 30 needs to continue to add the third preset time T3 until (T1+M×T3) is the same as the period (1/f2) corresponding to the second resolution (in this case, the second resolution is the minimum resolution 60 Hz).

In this case, the timing control unit 301 in the display driver 30 sends the second pulse B of the TE signal, to prolong the duration of the second frame to T1+4×T3. In the second frame, a refresh rate of the display 10 is reduced from a highest refresh rate 120 Hz to the minimum resolution 60 Hz as the duration of the second frame is prolonged.

Figure 8:
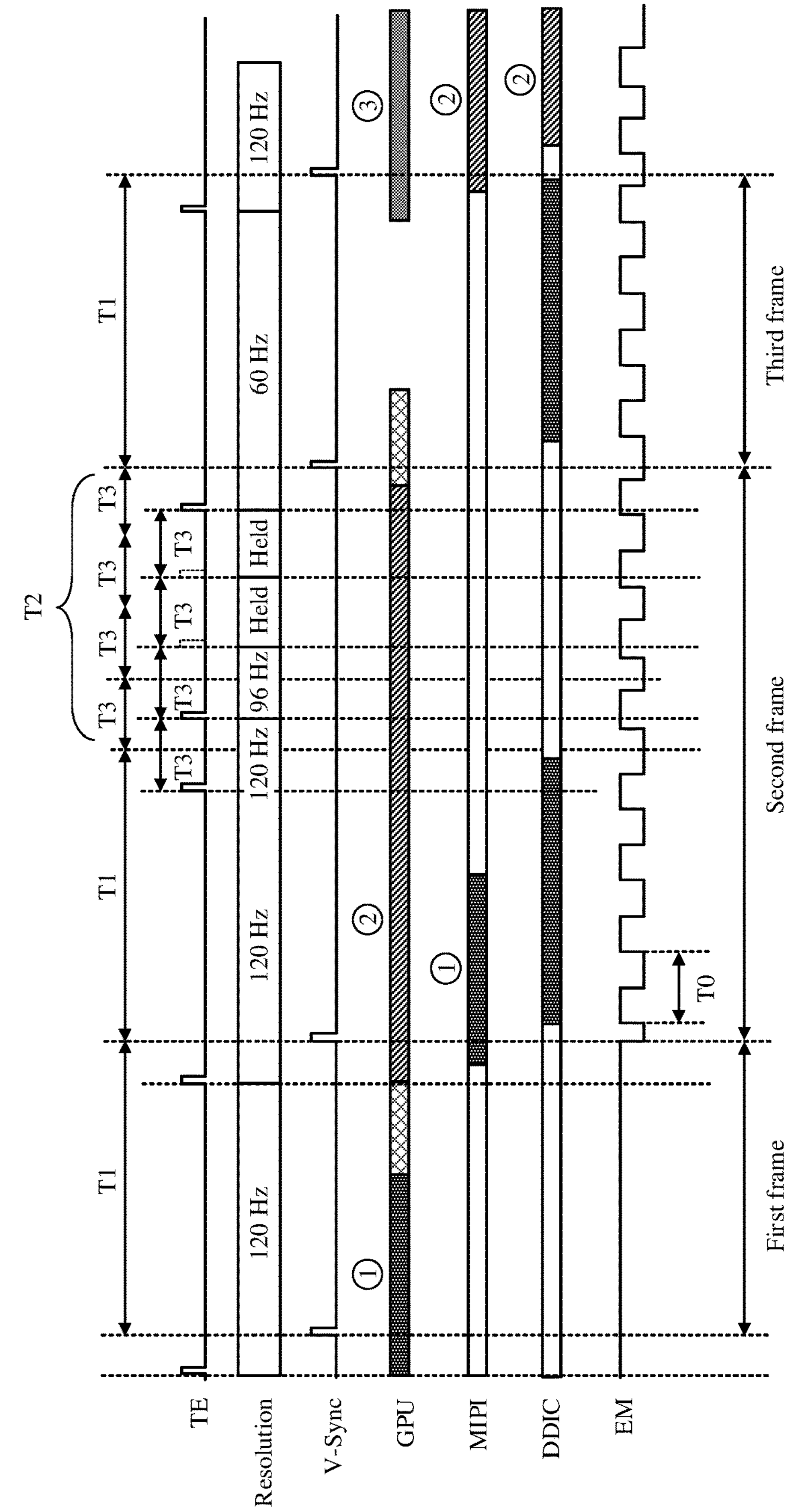
FIG. 8 is a schematic diagram of another timing signal of an electronic device according to some embodiments of this application.

Based on this, after the refresh rate of the display 10 is reduced to the minimum resolution 60 Hz, and the duration of the second frame is prolonged to T1+4×T3, as shown in FIG. 8, the time used by the GPU 401 to generate the $N^{th}$ frame (for example, the second frame) of display data still exceeds T1+4×T3. In this case, because the refresh rate of the display 10 has been reduced to the minimum resolution 60 Hz, to ensure that the display 10 can display an image, in the $(N+1)^{th}$ frame (for example, the third frame), the processing unit 302 in the display driver 30 may extract an $(N-1)^{th}$ frame (for example, the first frame) of DCS data packet ① from the frame buffer unit 304, and control, based on the $(N-1)^{th}$ frame (for example, the first frame) of DCS data packet ①, the display 10 to display an $(N-1)^{th}$ frame (for example, the first frame) of image.

Figure 9:
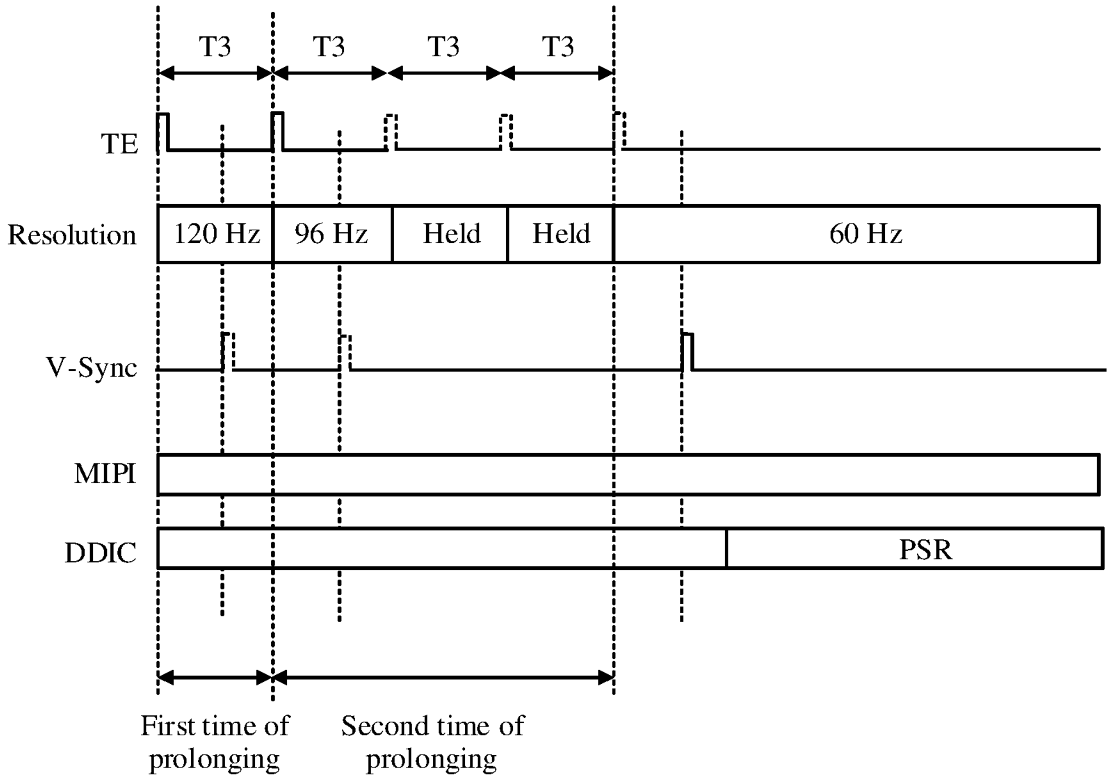
FIG. 9 is a schematic diagram of enabling a screen self-refresh mechanism by a display driver according to some embodiments of this application.

It can be learned from the foregoing descriptions that when a relatively long time is required when the GPU 401 generates the $N^{th}$ frame (for example, the second frame) of display data, the timing control unit 301 in the display driver 30 may send S (for example, S=2) second pulses B based on the resolution that can be supported by the display 10, to prolong the time of the $N^{th}$ frame (for example, the second frame) for a plurality of times (twice as shown in FIG. 9) until the refresh rate of the display 10 is reduced to the minimum resolution, for example, 60 Hz.

In this case, after the refresh rate of the display 10 has been reduced to the minimum resolution, if the $N^{th}$ frame (for example, the second frame) of display data generated by the GPU 401 still cannot be sent to the display driver 30 in the $(N+1)^{th}$ frame (for example, the third frame), and the transceiver unit 303 in the display driver 30 cannot receive the $N^{th}$ frame (for example, the second frame) of DCS data packet ② in the (N+1)th frame (for example, the third frame), the timing control unit 301 in the display driver 30 may enable a screen self-refresh (panel self refresh, PSR) mechanism, so that the processing unit 302 in the display driver 20 can extract an $(N-1)^{th}$ frame (for example, the first frame) of DCS data packet ① from the frame buffer unit 304, to control the display 10 to display an (N−1)th frame (for example, the first frame) of image.

In addition, in an ideal state, after the timing control unit 301 in the display driver 30 sends the TE signal to the display engine unit 402 in the host 40, the display engine unit 402 may send the data generated by the GPU 401 to the transceiver unit 303 in the display driver 30 based on the first pulse A or the second pulse B of the TE signal. However, limited by a responding speed of the host 40, there is a specific time difference ΔT between data receiving and data sending of the host 40.

Figure 10:
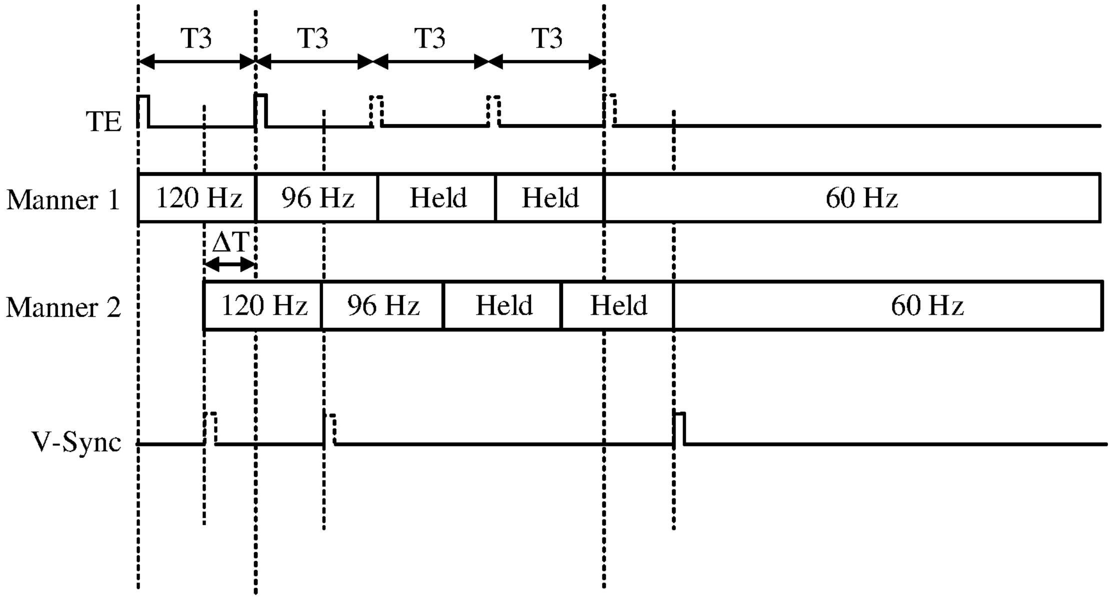
FIG. 10 is a schematic diagram of a signal sending manner of an electronic device according to some embodiments of this application.

In this case, to improve time validity of data processing of the entire display control circuit system 02, as shown in FIG. 10, the timing control unit 301 may send the first pulse of the TE effect signal or the second pulse of the TE signal ahead of time by one time variation ΔT each time (in other words, the manner 2 is used).

A manner in which the timing control unit 301 of the display driver 30 sends the TE signal when the time used by the GPU 401 to generate the $N^{th}$ (for example, the second frame) of display data exceeds the first preset time T1 is described above by using an example in which the resolutions that can be supported by the electronic device 01 include a maximum resolution 120 Hz, a minimum resolution 60 Hz, and an intermediate resolution 96 Hz. In some other embodiments of this application, the resolutions that can be supported by the electronic device 01 include a maximum resolution 96 Hz and a minimum resolution 60 Hz. The maximum resolution may be the foregoing first resolution f1=96 Hz, and the first preset time T1=1/f1=10.41 ms.

Figure 11:
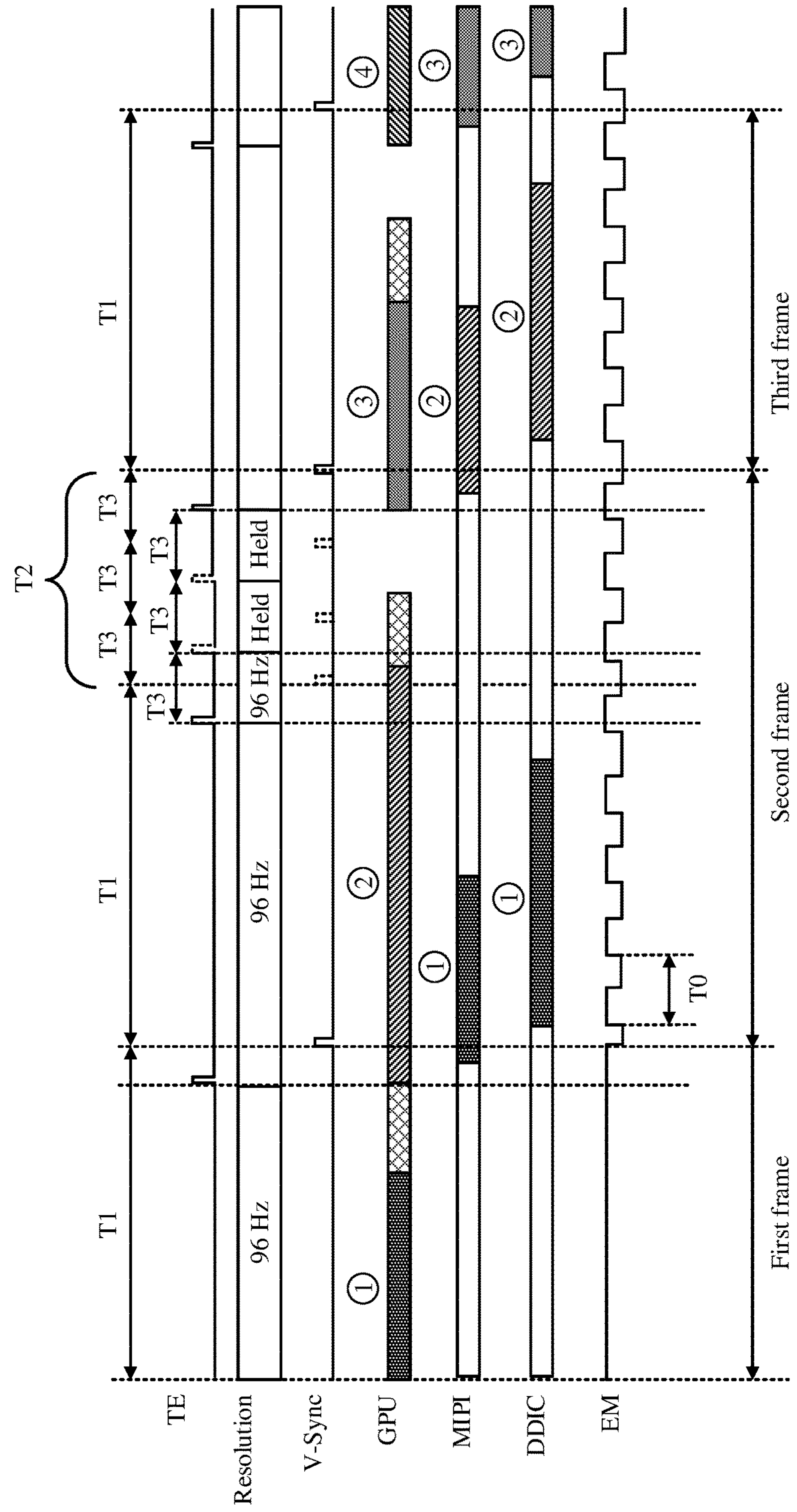
FIG. 11 is a schematic diagram of another timing signal of an electronic device according to some embodiments of this application.

In this case, as shown in FIG. 11, when the time used by the GPU 401 in the host 40 to generate the first frame of display data is within the first preset time T1, it may be learned from the foregoing descriptions that the display engine unit 402 in the host 40 may transmit, in the second frame, the first frame of DCS data packet ① to the display driver 30 through the MIPI interface, and the display driver 30 controls, based on the first frame of DCS data packet ①, the display 10 to display the first frame of image.

In addition, as shown in FIG. 11, in the second frame, the time used by the GPU 401 in the host 40 to generate the second frame of display data exceeds the first preset time T1. In this case, the timing control unit 301 in the display driver 30 may first determine, at an interval of one third preset time T3, whether (T1+T3) is the same as the period (1/f2=10.41 ms) corresponding to the second resolution (for example, the intermediate resolution 96 Hz).

For example, the third preset time T3 is the same as the period T0 (T0=T1/5=10.41 ms/5=2.08 ms) of the light-emitting control signal EM. T1+T3=10.41 ms+2.08 ms=12.49 ms, and is different from the period (1/f2=16.67 ms) corresponding to the second resolution (in this case, the second resolution is the minimum resolution 60 Hz). The timing control unit 301 in the display driver 30 does not send the second pulse of the TE signal, but is in a held state.

Then, the timing control unit 301 in the display driver 30 needs to continue to add the third preset time T3 until (T1+M×T3)=(10.41 ms+M×2.08 ms)=(10.41 ms+4×2.08 ms)=16.67 ms is the same as the period (1/f2=16.67 ms) corresponding to the second resolution (in this case, the second resolution is the minimum resolution 60 Hz).

In this case, the timing control unit 301 in the display driver 30 sends the second pulse of the TE signal, to prolong the duration of the second frame to T1+3×T3. In the second frame, a refresh rate of the display 10 is reduced from a highest refresh rate 96 Hz to the minimum resolution 60 Hz as the duration of the second frame is prolonged.

It should be noted that, descriptions are provided above by using an example in which the resolutions that can be supported by the electronic device 01 include 120 Hz, 96 Hz, and 60 Hz, or the resolutions that can be supported by the electronic device 01 include 96 Hz and 60 Hz when the period of the light-emitting control signal EM is T0=2.08 ms. Certainly, the user may further set the period T0 of the light-emitting control signal EM based on a requirement. After a value of the period T0 of the light-emitting control signal EM changes, the resolutions that can be supported by the electronic device 01 are not limited to the foregoing several resolutions.

Figure 12:
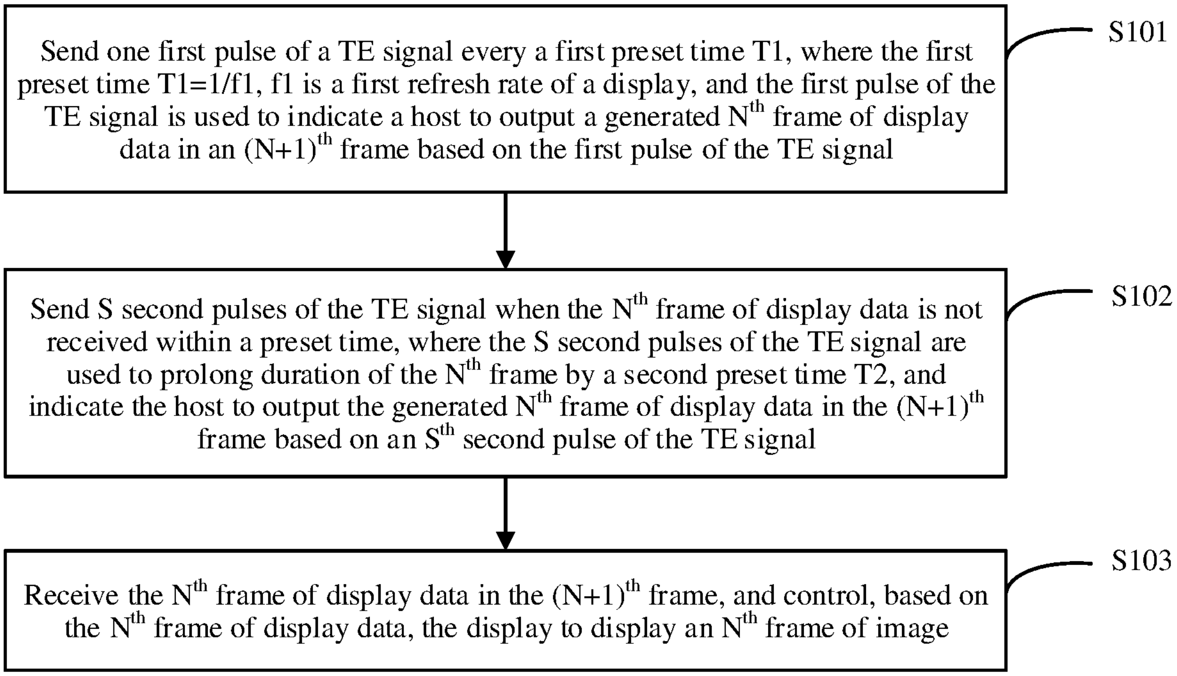
FIG. 12 is a flowchart of a control method of a display driver according to some embodiments of this application.

An embodiment of this application provides a control method of a display driver 30, and the method is used to drive a display 10 to perform display. As shown in FIG. 12, the method includes S101 to S103.

S101. Send one first pulse A of a TE signal every a first preset time T1, where the first preset time T1=1/f1, f1 is a first refresh rate of the display, and the first pulse A of the TE signal is used to indicate a host 40 to output a generated $N^{th}$ frame of display data in an $(N+1)^{th}$ frame based on the first pulse A of the TE signal.

N is a positive integer. The first refresh rate may be a highest refresh rate of the display 10, for example, 120 Hz. For example, the first refresh rate f1=120 Hz, and the first preset time T1=1/f1=1/120=8.33 ms.

It can be learned from the foregoing descriptions that a GPU 401 in the host 40 is configured to generate each frame of display data. The display engine unit 402 is configured to: receive a TE signal sent by a timing control unit 301, and send, in an $(N+1)^{th}$ frame (for example, a second frame) based on the TE signal to a display driver 30 in a form of a display command packet, an $N^{th}$ frame (for example, a first frame) of display data stored in a storage unit 403.

S102. Send S second pulses B of the TE signal when the $N^{th}$ frame of display data is not received within a preset time, where the S second pulses B of the TE signal are used to prolong duration of the $N^{th}$ frame by a second preset time T2, and indicate the host 40 to output the generated $N^{th}$ frame of display data in the $(N+1)^{th}$ frame based on an $S^{th}$ second pulse B of the TE signal.

S is a positive integer, (T1+T2)≤(1/f2), f2 is a second refresh rate of the display 10, and the first refresh rate f1 is greater than the second refresh rate f2.

For example, when an electronic device displays a relatively complex dynamic image, for example, when a user plays a large game, the GPU 401 cannot generate the $N^{th}$ frame of display data (for example, a second frame of display data) in one frame, for example, the second frame (in other words, T1=8.33 ms) shown in FIG. 4. Consequently, the display driver 30 cannot receive the foregoing second frame of DCS data packet ② within the preset time. In this case, the timing control unit 301 in the display driver 30 may send the S second pulses B of the TE signal, to prolong the duration of the $N^{th}$ (for example, the second frame) frame by the second preset time T2, so that the GPU 401 can generate the second frame of display data after the duration of the second frame is prolonged to T1+T2.

In this way, after one second pulse B is regenerated for the TE signal, a transceiver unit 303 in the display driver 30 still does not receive the $N^{th}$ frame (for example, the second frame) of display data (in other words, the second frame of DCS data packet ②) within the preset time. The timing control unit 301 in the display driver 30 may continue to regenerate the second pulse of the TE signal until the duration of the $N^{th}$ frame (for example, the second frame) is prolonged so that the GPU 401 can generate the second frame of display data.

Based on this, S102 specifically includes: When a time used by the GPU 401 to generate the $N^{th}$ frame (for example, the second frame) of display data exceeds the first preset time T1, the timing control unit 301 in the display driver 30 may send the second pulse B of the TE signal when it is determined, for M consecutive times every a third preset time T3 each time, that (T1+M×T3)=(1/f2), as shown in FIG. 7. M≥S, M is a positive integer, and M×T3=T2. In this way, each time before the second pulse B of the TE signal is sent, it may be determined whether a time by which the second pulse B can prolong the duration of the $N^{th}$ frame is equal to a period corresponding to one resolution that can be supported by the electronic device 01, so that duration obtained after the $N^{th}$ frame (for example, the second frame) is prolonged each time needs to match the resolution that can be supported by the electronic device 01.

It can be learned from the foregoing descriptions that when a time of a frame is prolonged, a refresh rate of the frame is also reduced. To ensure that luminance of the display 10 remains unchanged when the resolution changes, a time by which the second frame is prolonged each time, in other words, the third preset time T3 may be the same as a period T0 (T0=T1/4=2.08 ms) of a light-emitting control signal EM.

In addition, to improve time validity of data processing of an entire display control circuit system 02, as shown in FIG. 10, the timing control unit 301 may send the first pulse of the TE effect signal or the second pulse of the TE signal ahead of time by one time variation ΔT each time. The time variation ΔT is a difference between a time when the host 40 receives data and a time when the host 40 sends data.

S103. Receive the $N^{th}$ frame of display data in the $(N+1)^{th}$ frame, and control, based on the $N^{th}$ frame of display data, the display 10 to display an $N^{th}$ frame of image.

It can be learned from the foregoing descriptions that one second pulse B is regenerated by using the TE signal, and the duration of the $N^{th}$ frame (for example, the second frame) is prolonged to T1+T2, so that the GPU 401 can generate display data in the $N^{th}$ frame (for example, the second frame). Further, in the $(N+1)^{th}$ frame (for example, a third frame), the display driver 30 may control the display 10 to display the $N^{th}$ frame (for example, the second frame) of image.

In addition, the method further includes: in the $(N+1)^{th}$ frame, when the $N^{th}$ frame (for example, the second frame) of display data is not received after an $S^{th}$ second pulse B of the TE signal is sent, it may be learned from the foregoing descriptions that the resolution of the display 10 has been reduced to a minimum resolution, for example, 60 Hz in the $N^{th}$ frame (for example, the second frame). In this case, the timing control unit 301 in the display driver 30 enables a PSR mechanism, so that the processing unit 302 in the display driver 30 may extract an $(N-1)^{th}$ frame (for example, a first frame) of DCS data packet ① from a frame buffer unit 304, to control the display 10 to display an $(N-1)^{th}$ frame (for example, the first frame) of image.

It should be noted that when the electronic device displays a relatively complex dynamic image, in most of display time, before the $S^{th}$ second pulse B of the TE signal, in other words, before the resolution of the display 10 is reduced to the minimum resolution, for example, 60 Hz, the transceiver unit 303 in the display driver 30 may receive the $N^{th}$ frame (for example, the second frame) of display data, to avoid repeated display of the $(N-1)^{th}$ frame (for example, the first frame) of image. Therefore, a quantity of times that the timing control unit 301 in the display driver 30 enables the PSR mechanism is small, and therefore, a probability of occurrence of image stalling can be effectively reduced.

In addition, an embodiment of this application provides a computer-readable medium, and the computer-readable medium stores a computer program. The foregoing method is implemented when the computer program is executed by a processor. An embodiment of this application provides a computer program product that includes instructions. When the computer program product runs on an electronic device, the electronic device is enabled to perform the foregoing method.

The computer-readable medium may be a read-only memory (read-only memory, ROM) or another type of static storage device that can store static information and instructions, a random access memory (random access memory, RAM) or another type of dynamic storage device that can store information and instructions, an electrically erasable programmable read-only memory (Electrically Erasable Programmable Read-Only Memory, EEPROM), or any other medium that can be used to carry or store expected program code in a form of an instruction or a data structure and that can be accessed by a computer, but is not limited thereto. The memory may exist independently, and is connected to the processor by using a communications bus. The memory may be alternatively integrated into the processor.

All or some of the foregoing embodiments may be implemented by using software, hardware, firmware, or any combination thereof. When the software program is used to implement the embodiments, the embodiments may be implemented all or partially in a form of a computer program product. The computer program product includes one or more computer instructions. When the computer instructions are loaded and executed on a computer, the procedures or functions according to the embodiments of this application are all or partially generated. The computer may be a general-purpose computer, a special-purpose computer, a computer network, or another programmable apparatus. The computer instruction may be stored in a computer-readable storage medium, or transmitted from one computer-readable storage medium to another computer-readable storage medium.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A display driver, comprising:

a timing controller, configured to send one first pulse of a tearing effect signal in each of a plurality of consecutive first preset times T1, wherein each first preset time T1 has a length of 1/f1, f1 is a first refresh rate of a display, each first pulse of the tearing effect signal indicates to a host to output a corresponding generated $N^{th}$ frame of display data in a corresponding $(N+1)^{th}$ frame based on the respective first pulse of the tearing effect signal, and N is a positive integer;

a transceiver, receive and send display data sent by the host; and a processor coupled to the transceiver;

wherein the timing controller is further configured to send S second pulses of the tearing effect signal when the transceiver does not receive a $N^{th}$ frame of display data within a third preset time, wherein each pulse of the S second pulses of the tearing effect signal is used to prolong duration of the $N^{th}$ frame by a second preset time T2, and indicates to the host to output the generated $N^{th}$ frame of display data in the $(N+1)^{th}$ frame based on an $S^{th}$ second pulse of the tearing effect signal, wherein S is a positive integer, (T1+T2)≤(1/f2), f2 is a second refresh rate of the display, and the first refresh rate is greater than the second refresh rate; and wherein the processor is configured to:

attempt to receive each $N^{th}$ frame of display data in the $(N+1)^{th}$ frame, and control, based on the $N^{th}$ frame of display data when each Nth frame of display data is received, the display to display an $N^{th}$ frame of image.

2. The display driver according to claim 1, wherein the timing controller is configured to send a second pulse of the tearing effect signal when it is determined, for each third preset time T3 of M consecutive third preset times T3, that (T1+M×T3)=(1/f2), wherein when the $S^{th}$ second pulse of the tearing effect signal is sent, the $N^{th}$ frame ends, and the duration of the $N^{th}$ frame is (T1+T2)=(1/f2), wherein M≥S, M is a positive integer, and M×T3=T2.

3. The display driver according to claim 2, wherein the display comprises a light-emitting diode, the third preset time T3 is the same as a period of a light-emitting control signal, and the light-emitting control signal controls a valid light-emitting duration of the light-emitting diode.

4. The display driver according to claim 2, wherein the display driver further comprises a frame buffer coupled to the transceiver, and the frame buffer is configured to buffer the display data received by the transceiver; and wherein the processor is configured to:

when the transceiver does not receive the $N^{th}$ frame of display data in the $(N+1)^{th}$ frame after the timing controller sends the $S^{th}$ second pulse of the tearing effect signal, extract an $(N-1)^{th}$ frame of display data from the frame buffer, and control, based on the $(N-1)^{th}$ frame of display data, the display to display an $(N-1)^{th}$ frame of image.

5. The display driver according to claim 2, wherein the timing controller is configured to send the first pulse of the tearing effect signal or the second pulse of the tearing effect signal ahead of time by one time variation ΔT each time, wherein the time variation ΔT is a difference between a time when the host receives data and a time when the host sends data.

6. A method, comprising:

sending one first pulse of a tearing effect signal in each of a plurality of consecutive first preset times T1, wherein each first preset time T1 has a length of 1/f1, f1 is a first refresh rate of a display, each first pulse of the tearing effect signal indicates to a host to output a corresponding generated $N^{th}$ frame of display data in a corresponding $(N+1)^{th}$ frame based on the respective first pulse of the tearing effect signal, and N is a positive integer;

sending S second pulses of the tearing effect signal when an $N^{th}$ frame of display data is not received within a third preset time, wherein each pulse of the S second pulses of the tearing effect signal is used to prolong a duration of the $N^{th}$ frame by a second preset time T2, and indicates to the host to output the generated $N^{th}$ frame of display data in the $(N+1)^{th}$ frame based on an $S^{th}$ second pulse of the tearing effect signal, S is a positive integer, (T1+T2)≤(1/f2), f2 is a second refresh rate of the display, and the first refresh rate is greater than the second refresh rate; and attempting to receive the $N^{th}$ frame of display data in the $(N+1)^{th}$ frame, and controlling, based on the $N^{th}$ frame of display data when the Nth frame of display data is received, the display to display the received $N^{th}$ frame of image.

7. A non-transitory computer-readable storage medium, wherein the computer-readable storage medium stores a computer program, and when the computer program is executed by a processor, the method according to claim 6 is implemented.

8. A non-transitory computer program product comprising instructions, wherein when the computer program product runs on an electronic device, the electronic device is enabled to perform the method according to claim 6.

9. The method according to claim 6, wherein sending the S second pulses of the tearing effect signal when the $N^{th}$ frame of display data is not received within a preset time comprises:

sending the second pulse of the tearing effect signal when it is determined, for third preset time T3 of M consecutive third preset times T3, that (T1+M×T3)=(1/f2), wherein when the $S^{th}$ second pulse of the tearing effect signal is sent, the $N^{th}$ frame ends, and the duration of the $N^{th}$ frame is (T1+T2)=(1/f2), and wherein M≥S, M is a positive integer, and M×T3=T2.

10. The method according to claim 9, wherein the display comprises a light-emitting diode, the third preset time T3 is the same as a period of a light-emitting control signal, and the light-emitting control controls a valid light-emitting duration of the light-emitting diode.

11. The method according to claim 9, further comprising:

when the $N^{th}$ frame of display data is not received in the $(N+1)^{th}$ frame after the $S^{th}$ second pulse of the tearing effect signal is sent, extracting an $(N-1)^{th}$ frame of display data, and controlling, based on the $(N-1)^{th}$ frame of display data, the display to display an $(N-1)^{th}$ frame of image.

12. The method according to claim 9, further comprising:

sending the first pulse of the tearing effect signal or the second pulse of the tearing effect signal ahead of time by one time variation ΔT each time, wherein the time variation ΔT is a difference between a time when the host receives data and a time when the host sends data.

13. A non-transitory computer-readable storage medium, wherein the computer-readable storage medium stores a computer program, and when the computer program is executed by a processor, the method according to claim 9 is implemented.

14. A non-transitory computer program product comprising instructions, wherein when the computer program product runs on an electronic device, the electronic device is enabled to perform the method according to claim 9.

15. An electronic device, comprising:

a display; and a display control circuit system, comprising a display driver and a host coupled to the display driver, wherein the display driver is coupled to the display, and is configured to drive the display to perform display;

wherein the display driver comprises:

a timing controller;

a transceiver; and a processor;

wherein the timing controller is configured to send one first pulse of a tearing effect signal in each of a plurality of consecutive first preset times T1, wherein each first preset time T1 has a length of 1/f1, f1 is a first refresh rate of the display, each first pulse of the tearing effect signal indicates to a host to output a corresponding generated $N^{th}$ frame of display data in a corresponding $(N+1)^{th}$ frame based on the respective first pulse of the tearing effect signal, and N is a positive integer;

wherein the transceiver is configured to receive and send the display data sent by the host;

wherein the timing controller is further configured to send S second pulses of the tearing effect signal when the transceiver does not receive an $N^{th}$ frame of display data within a third preset time, wherein each pulse of the S second pulses of the tearing effect signal is used to prolong duration of the $N^{th}$ frame by a second preset time T2, and indicates the host to output the generated $N^{th}$ frame of display data in the $(N+1)^{th}$ frame based on an $S^{th}$ second pulse of the tearing effect signal, S is a positive integer, $(T1+T2) \leq (1/f2)$, f2 is a second refresh rate of the display, and the first refresh rate is greater than the second refresh rate; and wherein the processor is coupled to the transceiver, and is configured to:

attempt to receive the $N^{th}$ frame of display data in the $(N+1)^{th}$ frame, and control, based on the $N^{th}$ frame of display data when the Nth frame of display data is received, the display to display an $N^{th}$ frame of image; and wherein the host is configured to output the generated $N^{th}$ frame of display data in the $(N+1)^{th}$ frame based on the first pulse or the second pulse of the tearing effect signal.

16. The electronic device according to claim 15, wherein the timing controller is configured to send a second pulse of the tearing effect signal when it is determined, for each third preset time T3 of M consecutive third preset times T3, that $(T1+M \times T3)=(1/f2)$, wherein when the $S^{th}$ second pulse of the tearing effect signal is sent, the $N^{th}$ frame ends, and the duration of the $N^{th}$ frame is $(T1+T2)=(1/f2)$, and wherein $M \geq S$, M is a positive integer, and $M \times T3=T2$.

17. The electronic device according to claim 15, wherein the display comprises a light-emitting diode, the third preset time T3 is the same as a period of a light-emitting control signal, and the light-emitting control signal controls a valid light-emitting duration of the light-emitting diode.

18. The electronic device according to claim 15, wherein the display driver further comprises a frame buffer coupled to the transceiver, and the frame buffer is configured to buffer the display data received by the transceiver; and wherein the processor is configured to:

when the transceiver does not receive the $N^{th}$ frame of display data in the $(N+1)^{th}$ frame after the timing controller sends the $S^{th}$ second pulse of the tearing effect signal, extract an $(N-1)^{th}$ frame of display data from the frame buffer, and control, based on the $(N-1)^{th}$ frame of display data, the display to display an $(N-1)^{th}$ frame of image.

19. The electronic device according to claim 18, wherein the timing controller is configured to send the first pulse of the tearing effect signal and the second pulse of the tearing effect signal ahead of time by one time variation $\Delta T$ each time, wherein the time variation $\Delta T$ is a difference between a time when the host receives data and a time when the host sends data.

20. The electronic device according to claim 18, wherein the host comprises:

an image processor, configured to: generate the $N^{th}$ frame of display data, and send the $N^{th}$ frame of display data when generating an $(N+1)^{th}$ frame of display data;

a storage device, coupled to the image processor, and configured to receive and store the $N^{th}$ frame of display data generated by the image processor; and a display engine, coupled to the display driver and the storage device, and configured to output the $N^{th}$ frame of display data stored in the storage device to the display driver in the $(N+1)^{th}$ frame based on the first pulse or the second pulse of the tearing effect signal.

* * * * *